United States Patent
Yu et al.

(10) Patent No.: US 8,028,154 B2
(45) Date of Patent: *Sep. 27, 2011

(54) METHOD AND SYSTEM FOR REDUCING INSTRUCTION STORAGE SPACE FOR A PROCESSOR INTEGRATED IN A NETWORK ADAPTER CHIP

(75) Inventors: Kelly Yu, Irvine, CA (US); Takashi Tomita, Laguna Niguel, CA (US); Jonathan F. Lee, Dublin, CA (US)

(73) Assignee: Broadcom Corporation, Irvine, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 11/273,281

(22) Filed: Nov. 14, 2005

(65) Prior Publication Data

US 2007/0028087 A1 Feb. 1, 2007

Related U.S. Application Data

(60) Provisional application No. 60/703,773, filed on Jul. 29, 2005.

(51) Int. Cl.
*G06F 9/00* (2006.01)
*G06F 15/177* (2006.01)
*G06F 9/30* (2006.01)
*G06F 9/40* (2006.01)
*G06F 7/38* (2006.01)
*G06F 9/44* (2006.01)

(52) U.S. Cl. .......................... 713/2; 712/220; 712/209

(58) Field of Classification Search ....... 713/2; 712/209
See application file for complete search history.

(56) References Cited

U.S. PATENT DOCUMENTS

| | | | |
|---|---|---|---|
| 4,542,453 A * | 9/1985 | Patrick et al. ..................... 714/8 |
| 5,901,225 A | 5/1999 | Ireton et al. |
| 6,480,948 B1 | 11/2002 | Virajpet et al. |
| 6,567,911 B1 * | 5/2003 | Mahmoud ......................... 713/2 |
| 6,633,969 B1 * | 10/2003 | Lin .............................. 712/210 |
| 7,194,502 B1 | 3/2007 | Gavlik et al. |
| 7,315,940 B1 * | 1/2008 | Audette et al. ................... 713/2 |
| 7,523,299 B2 | 4/2009 | Yu et al. |
| 7,689,819 B2 | 3/2010 | Yu et al. |
| 2002/0032718 A1 * | 3/2002 | Yates et al. ..................... 709/107 |
| 2003/0161453 A1 * | 8/2003 | Veschi ......................... 379/93.05 |
| 2003/0196096 A1 | 10/2003 | Sutton |
| 2005/0228980 A1 | 10/2005 | Brokish et al. |
| 2005/0262329 A1 * | 11/2005 | Krishnan et al. .............. 712/210 |

OTHER PUBLICATIONS

Asante, EtherPaC 2000+Series: Plug-and-Play ISA Ethernet Adapter Installation Guide, 1996.

* cited by examiner

*Primary Examiner* — Eddie P Chan
*Assistant Examiner* — George D Giroux
(74) *Attorney, Agent, or Firm* — McAndrews, Held & Malloy, Ltd

(57) ABSTRACT

Certain embodiments for reducing instruction storage space for a processor integrated in a network adapter chip may include generating MIPS instructions from corresponding new instructions. The new instructions may be in patch code instruction (PCI) format. The new instructions may be decoded and the MIPS instructions may be generated by a MIPS processor within a network adapter chip. Decoding the new instructions may also be referred to as interpreting the new instructions. The new instructions may comprise fewer bits than the generated MIPS instructions. The generated MIPS instructions may be executed by the MIPS processor within the network adapter chip.

30 Claims, 13 Drawing Sheets

| Offset 0x00 | Signature 250a | Format 250b | Rsvd 250c | MAC address 250d |
|---|---|---|---|---|
| 0x04 | MAC address 250d | | | |
| 0x08 | Rsvd 250e | | | |
| 0x0c | Rsvd 250e | | | Configuration 250f |
| 0x10 | Checksum 250g | Rsvd 250h | 250i (S ... I) | Rsvd 250j |
| 0x14 | Data Block 250k | | | |
| ... | | | | |

Fig. 2b

Extended Instruction 308

| Bits | 31–28 | 27–24 | 23–20 | 19–16 | 15–12 | 11–10 | 9–6 | 5–3 | 2–0 |
|---|---|---|---|---|---|---|---|---|---|
| 308a | (0xf) | (0x7) | (0xf) | (0xf) | (0x0) | Opcode | Shift | Dst | Src |

| Bits | 31–28 | 27–24 | 23–20 | 19–16 | 15–12 | 11–0 |
|---|---|---|---|---|---|---|
| 308b | (0xf) | (0x7) | (0xf) | (0xf) | (0x1) | Number of microseconds to delay |

| Bits | 31–28 | 27–24 | 23–20 | 19–16 | 15–12 | 11–8 | 7–0 |
|---|---|---|---|---|---|---|---|
| 308c | (0xf) | (0x7) | (0xf) | (0xf) | (0x2) | Speed | Count |

| Bits | 31–28 | 27–24 | 23–20 | 19–16 | 15–12 | 11–6 | 5–3 | 2–0 |
|---|---|---|---|---|---|---|---|---|
| 308d | (0xf) | (0x7) | (0xf) | (0xf) | (0xf) | opcode | Dst GPR | Src GPR |

Fig. 3d

METHOD AND SYSTEM FOR REDUCING INSTRUCTION STORAGE SPACE FOR A PROCESSOR INTEGRATED IN A NETWORK ADAPTER CHIP

CROSS-REFERENCE TO RELATED APPLICATIONS/INCORPORATION BY REFERENCE

This application makes reference to, claims priority to, and claims benefit of U.S. Provisional Application Ser. No. 60/703,773 filed Jul. 29, 2005.

This application also makes reference to:
U.S. patent application Ser. No. 11/273,280 filed Nov. 14, 2005; and
U.S. patent application Ser. No. 11/273,237 filed Nov. 14, 2005.

Each of the above stated applications is hereby incorporated herein by reference in its entirety.

FIELD OF THE INVENTION

Certain embodiments of the invention relate to network devices. More specifically, certain embodiments of the invention relate to a method and system for reducing instruction storage space for a processor integrated in a network adapter chip.

BACKGROUND OF THE INVENTION

High-speed digital communication networks over copper and optical fiber are used in many network communication and digital storage applications. Ethernet and Fiber Channel are two widely used communication protocols, and the protocols continue to evolve in response to increasing demand for higher bandwidth in digital communication systems.

The Ethernet protocol may provide collision detection and carrier sensing in the physical layer of the OSI protocol model. The physical layer, layer 1, is responsible for handling all electrical, optical, opto-electrical and mechanical requirements for interfacing to the communication media. Notably, the physical layer may facilitate the transfer of electrical signals representing an information bitstream. The physical layer may also provide services such as, for example, encoding, decoding, synchronization, clock data recovery, and transmission and reception of bit streams. Gigabit Ethernet (GbE), which initially found application in gigabit servers, is becoming widespread in personal computers, laptops, and switches, thereby providing the necessary infrastructure for handling data traffic for PCs and servers.

As the demand for higher data rates and bandwidth continues to increase, equipment vendors are employing new design techniques for manufacturing network layer 1 equipment capable of handling these increased data rates. However, the equipment vendors are also trying to limit cost rise associated with the newer equipment, if not reduce the cost, with respect to the previous generation of equipment. Chip real estate and printed circuit board (PCB) real estate are generally expensive.

Traditionally, network equipment vendors have used memory external to a processor in which to store boot code for the processor. The external memory, which may be at least one memory chip, may incur further expenses to the manufacturer in addition to a cost of the memory chip. For example, the additional cost may be due to the additional printed circuit board real estate required for the chip, and/or the increased complexity for layout of the signal traces from the memory chip to the processor, and other chips to which the memory chip may be coupled.

Accordingly, boot code may be stored in a ROM section of a processor chip. In this manner, an additional large ROM chip or NVRAM chip may not be needed to store boot code for the processor chip. However, for these cases in which modification to the code in the ROM is desired, executable code may be stored in a small NVRAM. However, depending on the size of the executable code, it may be necessary to increase the size of the NVRAM. As the size of the NVRAM increases, the cost associated with the NVRAM may increase due to the chip cost, the additional real estate needed, and the interconnect cost if more pins are required for the larger NVRAM.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for reducing instruction storage space for a processor integrated in a network adapter chip, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2b is an exemplary memory map format 1 for a NVRAM that may be used to store code patches, in accordance with an embodiment of the invention, in accordance with an embodiment of the invention.

FIG. 3d is a diagram of an exemplary set of extended instructions in PCI format, in accordance with an embodiment of the invention.

DETAILED DESCRIPTION OF THE INVENTION

Certain embodiments of the invention may be found in a method and system for reducing instruction storage space for a processor integrated in a network adapter chip. Aspects of the method may comprise generating MIPS instructions from corresponding new instructions. The new instructions may be in patch code instruction (PCI) format that differs from the MIPS instructions. The new instructions may be decoded and resulting MIPS instructions may be generated from the decoding by a MIPS processor within a network adapter chip. Decoding the new instructions may also be referred to as interpreting the new instructions. The new instructions may comprise fewer bits than the generated MIPS instructions, thereby requiring less storage space. The generated MIPS instructions may be executed by the MIPS processor within the network adapter chip.

Although some embodiments of the invention may refer to the MIPS processor and MIPS instructions, the invention need not be so limited. This idea may be used for other processors with respect to their native instruction sets.

Figure 1:
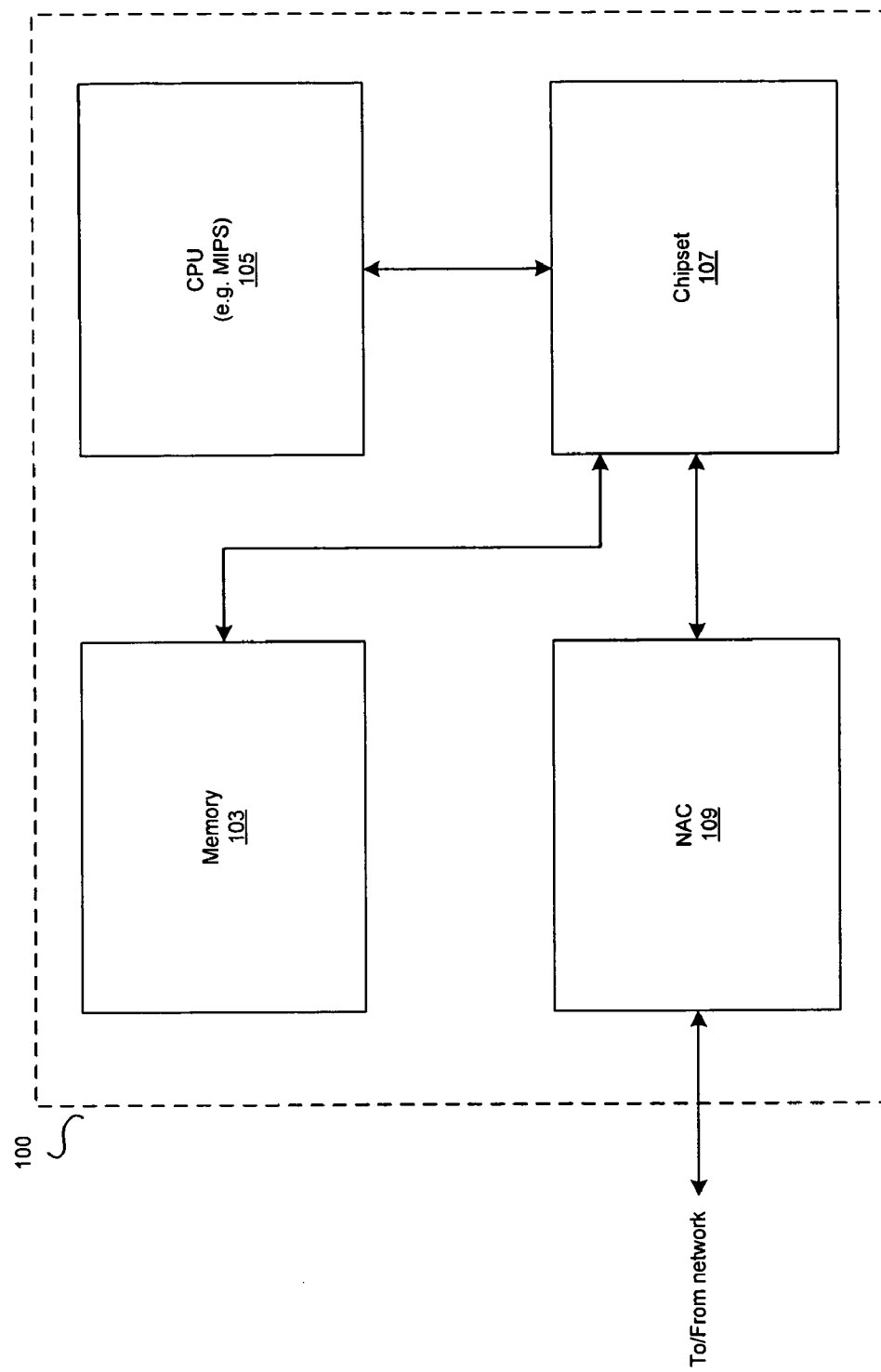
FIG. 1 is a block diagram illustrating an exemplary network interface system, which may be utilized in connection with an embodiment of the invention.

FIG. 1 is a block diagram illustrating an exemplary network interface system, which may be utilized in connection with an embodiment of the invention. Referring to FIG. 1, there is shown a laptop 100 comprising exemplary components such as a memory block 103, a CPU 105, a chipset 107, and a network adapter chip (NAC) 109. The CPU 105 may communicate with the memory block 103 and the chipset 107, and the chipset 107 may communicate with the NAC 109. The NAC 109 may be physically connected to a network, such as, for example, an Ethernet network, via a cable. In this manner, the NAC 109 may transmit data to the network and receive data from the network.

The memory block 103 may comprise suitable logic, circuitry, and/or code that may be adapted to store a plurality of control, status, and/or data information. The information stored in memory block 103 may be accessed by other processing blocks, for example, the CPU 105.

The CPU 105 may comprise suitable logic, circuitry, and/or code that may be adapted to process data that may be read from, for example, the memory block 103. The CPU 105 may store data in the memory block 103, and/or communicate data, status, and/or commands with other devices in the laptop 100, for example, the chipset 107 and/or the NAC 109.

The chipset 107 may comprise suitable logic, circuitry, and/or code that may be adapted to manage input/output data such as voice and/or data traffic from the CPU to the memory block 103 and/or peripheral devices, for example, the NAC 109.

The NAC 109 may comprise suitable logic, circuitry, and/or code that may be adapted to physically interface to the network, for example, the Ethernet network, via a cable. Accordingly, the laptop 100 may send and receive data to and from the Ethernet network.

In operation, the CPU 105 may communicate data to the NAC 109 for transmission to a network destination. Data may be received from a network source, for example, an external computer that may also be on the network, and the NAC 109 may indicate to the CPU 105 the availability of the received data. The CPU 105 may then process the data and/or save the data in the memory block 103.

Figure 2A:
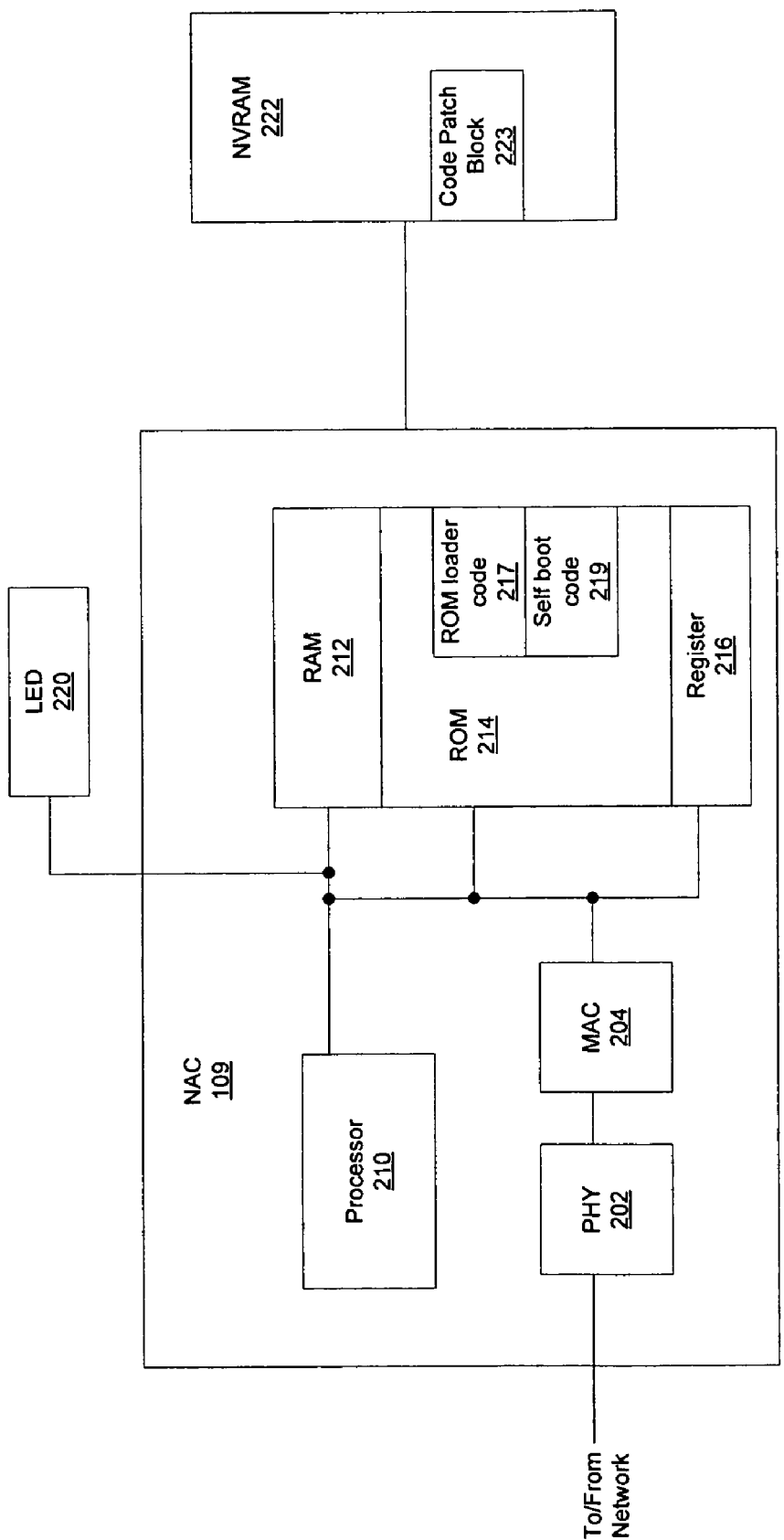
FIG. 2a is a block diagram of an exemplary network adapter chip comprising on-chip ROM loader code and a self-boot code, in accordance with an embodiment of the invention.

FIG. 2a is a block diagram of an exemplary network adapter chip comprising on-chip ROM loader code and on-chip self-boot code, in accordance with an embodiment of the invention. Referring to FIG. 2a, there is shown the NAC 109, an LED 220, and a NVRAM 222. The NAC 109 that may comprise a processor 210, RAM 212, ROM 214, and a register block 216. Additionally, the NAC 109 may comprise physical network interface layer (PHY) 202 and a media access controller (MAC) 204. The register block may be hardware registers and/or a portion of the RAM 212. The NVRAM 222 may be, for example, an EEPROM or FLASH memory.

The processor 210 may use ROM loader code 217 and the self-boot code 219 that may be stored, for example, in the ROM 214, and instructions in a code patch block 223 in the NVRAM 222 to boot the NAC 109. After a successful boot, the processor 210 may be involved in transmitting data to a network, or receiving data from the network. The processor 210 may use the RAM 212 to temporarily store data, for example, which is to be transmitted to the network, or, which has been received from the network. Information in the NVRAM 222 may be used during the boot and/or after the boot. The register block 216 may be used to hold data. The LED 220 may be used to indicate, for example, an error in a boot process by either turning on the LED 220 steadily or by blinking the LED 220. The U.S. application Ser. No. 11/273, 280, filed on even date herewith, provides a detailed description of the boot process, and is hereby incorporated herein by reference in its entirety.

The PHY 202 may comprise suitable logic, circuitry, and/ or code that may be adapted to interface to a network, for example, an Ethernet network. For example, the PHY 202 may be fully compatible with at least IEEE 802.3 standard for auto-negotiation of data transfer speed, where the IEEE 802.3 may be the IEEE standard for Ethernet.

The MAC 204 may comprise suitable logic, circuitry, and/ or code that may be adapted to properly format data for packet transmission to a network, for example, the Ethernet network. The MAC 204 may also be adapted to receive data from the Ethernet network and to remove the Ethernet network related frame information so that higher level protocols may extract desired information from the received frame.

In operation, the PHY 202 may communicate data with the Ethernet network. The PHY 202 may receive Ethernet network data and transmit data to the Ethernet network. The PHY 202 may sense collision when transmitting data and may comply with the Carrier Sense Multiple Access/Collision Detect (CSMA/CD) access method defined in IEEE 802.3

The data to be transmitted may be received, for example, from the CPU 105 via the chipset 107. The MAC 204 may form appropriate frames for the data to be transmitted and may communicate the frames to the PHY 202. Additionally, the MAC 204 may receive data from the Ethernet network via the PHY 202. The MAC 204 may remove the network related information, for example, the Ethernet protocol information, and may communicate the remaining data to, for example, the CPU 105 via, for example, the chipset 107. The CPU 105 may process the received frame to retrieve data that may have been sent by another application on the network.

FIG. 2b is an exemplary memory map format 1 for a NVRAM that may be used to store code patches, in accordance with an embodiment of the invention. Referring to FIG. 2b, there is shown a plurality of data fields in first five words of the NVRAM 222. There is shown a signature field 250a, a format field 250b, reserved fields 250c, 250e, 250h, and 250j, a MAC address field 250d, a configuration field 250f, a checksum field 250g, a 6-bit flag field 250i, and a data block 250k. The 6-bit flag field 250i may comprise a SCP flag S and an ICP flag. The remaining four bits may be used for other purposes, for example, that may relate to power supplied to the NAC 109. The size of the data block 250k may be as large as the size of the NVRAM 222 minus the first five bytes of the memory map format 1. Any bits in the reserved fields 250c, 250e, 250h, and 250j or unused bits may be set to, for example, zero.

Other memory map formats may be utilized without departing from the spirit of the invention. In this regard, although specific fields may have been disclosed, the invention need not be so limited. For example, in other embodiments of the invention, the format 1 memory map may specify a different number of bytes, and the fields described may have different number of bits, and/or the fields may be at different locations. Additionally, other fields may be added and/or described fields may be removed.

In accordance with an exemplary embodiment of the invention, the signature field 250a may identify the type of data stored in an NVRAM. For example, a NVRAM that supports self-boot code 219 may have a particular bit pattern, for example, 0xA5. This may indicate that the NVRAM may have supplementary code and/or information in, for example, code patch block 223. The code patch block 223 may comprise at least one code patch that may be used to modify boot functionality of the self-boot code 219. The code patch block 223 may be in native MIPS machine language or in instructions from a patch code instruction (PCI) set. Header information for each code patch may indicate whether the code patch comprises PCI format instructions or MIPS instructions. A code patch written in PCI format may be decoded during the boot process. The U.S. application Ser. No. 11/273, 237, filed on even date herewith, provides a detailed description of the code patch and its usage, and is hereby incorporated herein by reference in its entirety.

If the code patch cannot be decoded during the boot process, a code patch execution error may be indicated. The error may be indicated, for example, by asserting bit 13 of the memory location 0xC10 in the RAM 212. The instruction that cannot be decoded may be ignored without causing, for example, an interrupt, exception, error handling, or halting of the processor 210. Accordingly, the error may be indicated so that the processor 210 may, at a later time, read the memory location 0xC10. The processor 210 may, at that time, store information that an error occurred while decoding a code patch. This information may be used to troubleshoot or debug instructions in the code patch block 223 and/or decoding instructions in the self-boot code 219. In an exemplary embodiment of the invention, each code patch may be an initialization code patch (ICP) or a service code patch (SCP). Other types of code patches may also be provided.

The format field 250b may specify a type of self-boot NVRAM memory map format. For example, two exemplary NVRAM memory map formats may be format 0 and format 1. One exemplary embodiment of the invention may support up to eight formats with the present 3-bit format field 250b. Other embodiments of the invention may comprise N bits in the format field 250b, thus allowing up to $2^N$ number of formats. The MAC address field 250d may contain a MAC address. The MAC address may be a unique hardware address that may identify a network node. For example, the NAC 109 may be a network node, and the MAC address may be the address associated with the NAC 109.

The configuration field 250f may comprise information that may be utilized to determine how the NAC 109 may be configured. For example, whether the NAC 109 may be enabled or disabled, or the speed at which the NAC 109 may be used. For example, an Ethernet network may support 10 Mbps, 100 Mbps, 1 Gbps, and/or 10 Gbps data transfer rate, or even higher transfer rates. Checksum for the checksum field 250g may be generated by an algorithm that may, for example, add each byte of the first five words, and then perform a two's complement of the sum of the bytes. The value of the checksum field 250g may initially be zero for the purpose of generating the checksum. The generated checksum may be stored in the checksum field 250g in the fifth block. The checksum may be generated and stored at the appropriate location as part of compilation of source code and image creation for the NVRAM 222.

During execution of the ROM self-boot code 219, a checksum verification may add all bytes of the first five words, including the checksum. The resulting sum may be zero if there are no bit errors in the first five words. A non-zero result for the checksum verification may result in execution of an error routine that may retry the checksum verification. After a number of checksum verification failures, a system error may be generated that may result, for example, in ignoring data in the NVRAM 222. The response to checksum verification failure may be design and/or implementation dependent. For example, the CPU 105 may be interrupted after a checksum failure. Or, a flag may be asserted in a register or a memory location indicating a checksum failure.

The SCP flag S in the flag field 250i may be asserted if service code patch (SCP) is present in the data block. Otherwise, the SCP flag S may be deasserted. The ICP flag I in the flag field 250i may be asserted if initialization code patch (ICP) is present in the data block. Otherwise, the ICP flag I may be deasserted.

The data block 250k may comprise a plurality of data sub-blocks that may comprise the coach patch block 223 that may comprise ICP and SCP blocks. The ICP and SCP blocks may comprise initialization code patches (ICP) and the service code patches (SCP). The ICP and SCP may be instructions that may be executed in place of, or in addition to, various functions in the ROM boot code.

Figure 2C:
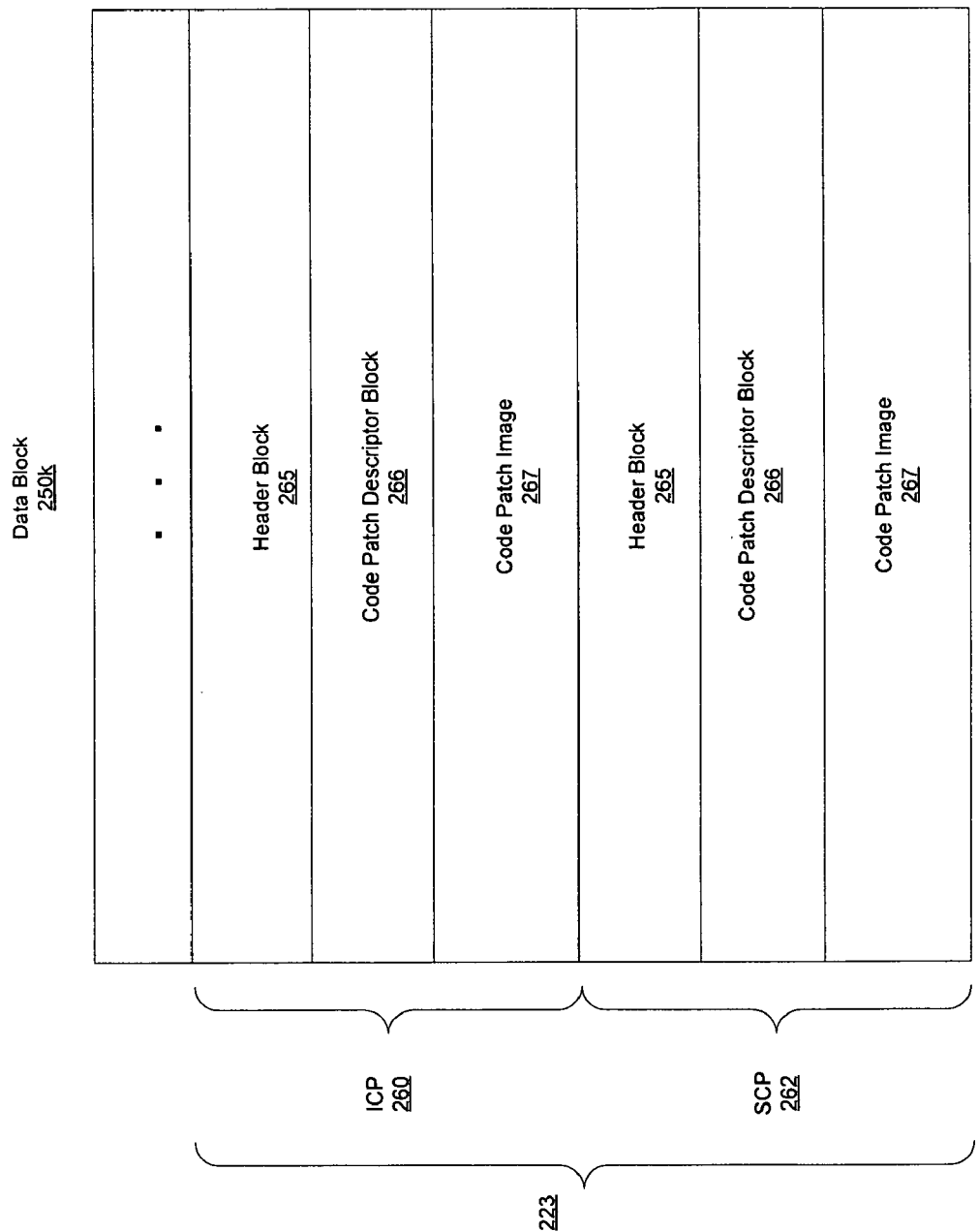
FIG. 2c is a diagram of an exemplary code patch block, in accordance with an embodiment of the invention.

FIG. 2c is a diagram of an exemplary code patch block, in accordance with an embodiment of the invention. Referring to FIG. 2c, there is shown the code patch block 223 that may comprise an ICP block 260 and a SCP block 262. The ICP block 260 and the SCP block 262 may each comprise a header block 265, a code patch descriptor block 266, and a code patch image block 267.

The header block 265 for the ICP block 260 or the SCP block 262 may comprise information about the number of code patches in the ICP block 260 or the SCP block 262. The header block 265 may also comprise information about the size of the corresponding code patch image block 267. The code patch descriptor block 266 may comprise a code patch descriptor for each code patch in the code patch image block 267. Even though each code patch descriptor may be 16 bits in size, the code patch descriptor block 266 may start and end on a 32-bit boundary. Accordingly, if there is an odd number of code patch descriptors, there may be a 16-bit padding that may be set to, for example, zeros. The code patch image block 267 may comprise at least one code patch, in which each code patch may correspond to at least one function in the self-boot code 219. The code patch in the code patch image block 267 may be executed in place of the corresponding function in the self-boot code 219, or in addition to, the corresponding function in the self-boot code 219.

The self-boot code 219 may use the header information in the header block 265 to load the code patch image block 267 from the NVRAM 222 to a beginning address of a portion of a RAM, for example, the RAM 212. This may occur, for example, during the initialization of the ICP and the SCP. If the ICP and the SCP are both copied, the ICP code patch image block 267 may be copied first and the SCP code patch image block 267 may be copied after the ICP code patch image block 267. The code patch image block 267 for the ICP and/or the SCP may be copied to a particular address of the RAM 212, such as, for example, 0x10000, during the ICP and SCP initialization, respectively. Initialization of the ICP and the SCP may also comprise copying portions of the header block 265 and code patch descriptors 366 . . . 369 in the code patch descriptor block 266 in order to access the specific code patches in the code patch image blocks 267.

The ICP block 260 may comprise at least one code patch that initializes, for example, the NAC 109. The service code in the self-boot code 219, which may execute after a boot phase, may execute in a loop. Accordingly, the patches for the SCP may be executed multiple times. The SCP block 262 may comprise, for example, a code patch that initiates power down of the NAC 109 and/or a code patch that initiates power down of specific circuitry in the NAC 109. The functionality that may be supported by the ICP block 260 and the SCP block 262 may be design and/or implementation dependent.

The code patches may be in native processor machine language instructions, for example, MIPS machine language instructions, or patch code instructions (PCI). Functions written using PCI format may result in a smaller image than similar functions written using native processor machine language instructions. A specific code patch may only use one type of instruction. This may be because each code patch may be identified as using a specific instruction set. Accordingly, a code patch may be executed without interpreting it if it is indicated that the code patch is in the native processor machine language. However, if a code patch is indicated to be in PCI format instructions, the instructions may be interpreted using the self-boot code 219 in the ROM 214. When the PCI format instruction cannot be decoded, a PCI error bit may be set at a particular address of a shared memory, and the PCI format instruction may be ignored. Such an error may not cause an interrupt, exception, error handling, or halting of the CPU.

Figure 2D:
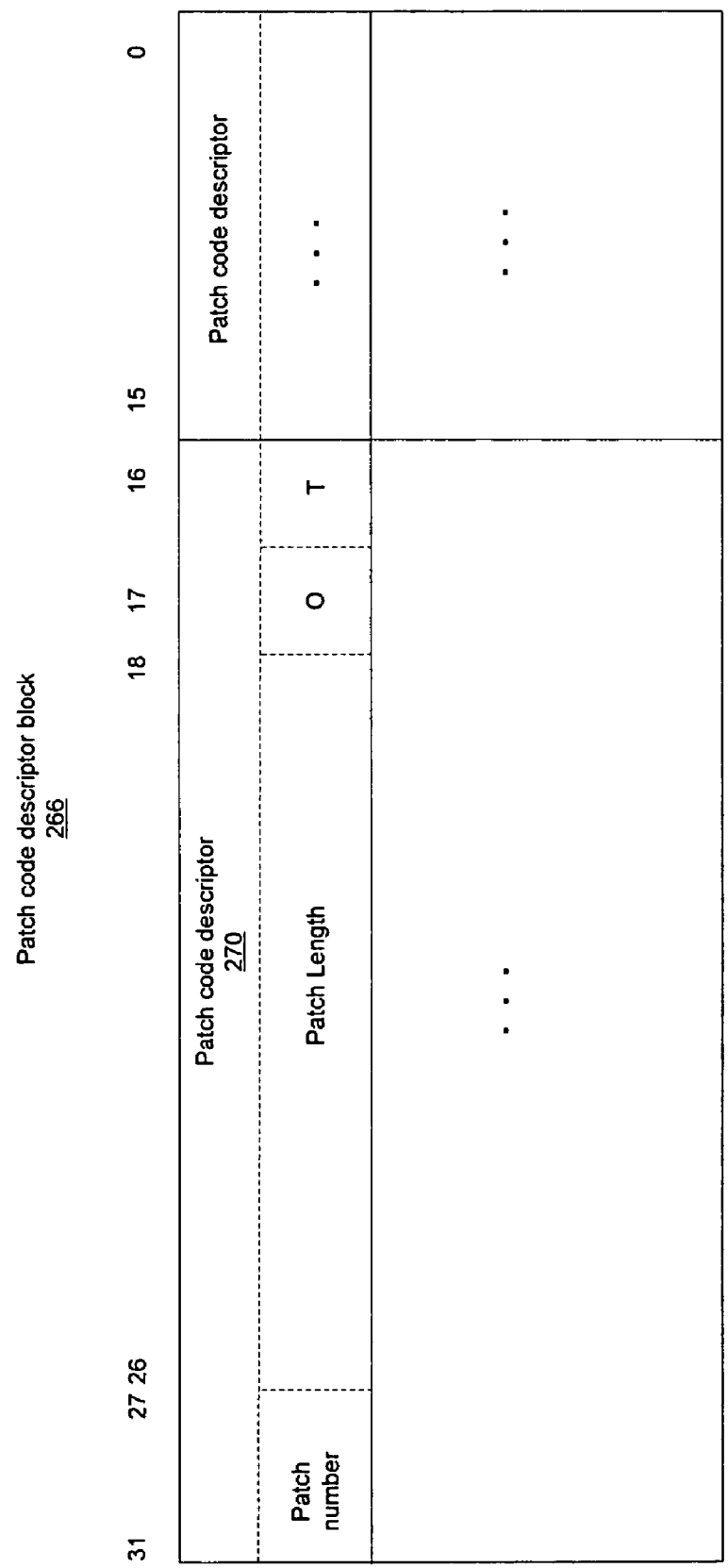
FIG. 2d is a diagram of an exemplary code patch descriptor, in accordance with an embodiment of the invention.

FIG. 2d is a diagram of an exemplary code patch descriptor, in accordance with an embodiment of the invention. Referring to FIG. 2d, there is shown the code patch descriptor block 266 that may comprise a plurality of code patch descriptors. Each code patch descriptor, for example, the code patch descriptor 270, may comprise four fields. The four fields may total 16 bits. The four fields may be a patch number field, a patch length field, an override bit O, and an instruction type bit T.

The patch number field may contain a reference number for the code patches, where the reference number may correspond to a function in the self-boot code 219. For example, a code patch in the ICP block 260 that corresponds to a first initialization function in the self-boot code 219 may have a patch number of zero. Similarly, a code patch in the SCP block 270 that corresponds to a fourth service function in the self-boot code 219 may have a code patch number of three.

The patch length field may contain a size of the corresponding code patch in words. A length of zero in the patch length field may be a null function. The zero length code patch may be used to effectively delete the corresponding function in the self-boot code 219. For example, the code patch length may be zero, and the corresponding function in the self-boot code 219 may be indicated to be overridden. Accordingly, the corresponding function may be skipped and no patch code may be executed in place of the skipped corresponding function.

The override bit O may indicate whether the corresponding function in the self-boot code 219 may be executed. For example, if the override bit O is asserted, the corresponding function in the self-boot code 219 may be overridden, and hence not executed. If the override bit is deasserted, the corresponding function in the self-boot code 219 may be executed after executing the corresponding code patch. If the code patch length is zero and the override bit O is asserted, then the net effect is as if the corresponding function in the self-boot code 219 is deleted.

The instruction type bit T may indicate whether the code patch corresponding to the code patch descriptor is in a native processor machine language or a patch code instruction (PCI) format. If the instruction type bit T is asserted, the corresponding code patch may be in the native processor machine language, for example, the MIPS machine language. If the instruction type bit T is not asserted, the corresponding code patch may be in the PCI format. Instructions in the PCI format may need to be interpreted by the self-boot code 219. A code patch may be either in the native processor machine language or the PCI format. A code patch may not have both the native processor machine language instructions and the PCI format instructions. The code patches written in the PCI format may result in a smaller object code than similar code patches in native processor machine language, and therefore require a smaller amount of memory to store the code patches. Accordingly, a much smaller NVRAM, for example, may be used to store the patch codes.

The PCI format instructions may be disclosed with respect to FIGS. 3a, 3b, 3c, 3d, 3e, 3f, and 3g. The addresses for memory locations may comprise 32 address bits. However, when a memory location is specified in the PCI format instructions, and some address bits are not specified, those address bits may have default values of zeros. For clarity, the PCI format instructions may have an underscore pre-pended to each instruction name. The PCI format instructions may be decoded by the processor 210 while it is executing the self-boot code 219. The decoded instructions may be, for example, MIPS instructions, and the processor 210 may execute the decoded instructions. In accordance with an exemplary embodiment of the invention, the PCI format instructions may be single word instructions, double word instructions, or triple word instructions. Unless otherwise specified, the PCI format instructions may be single word instructions.

Figure 3A:
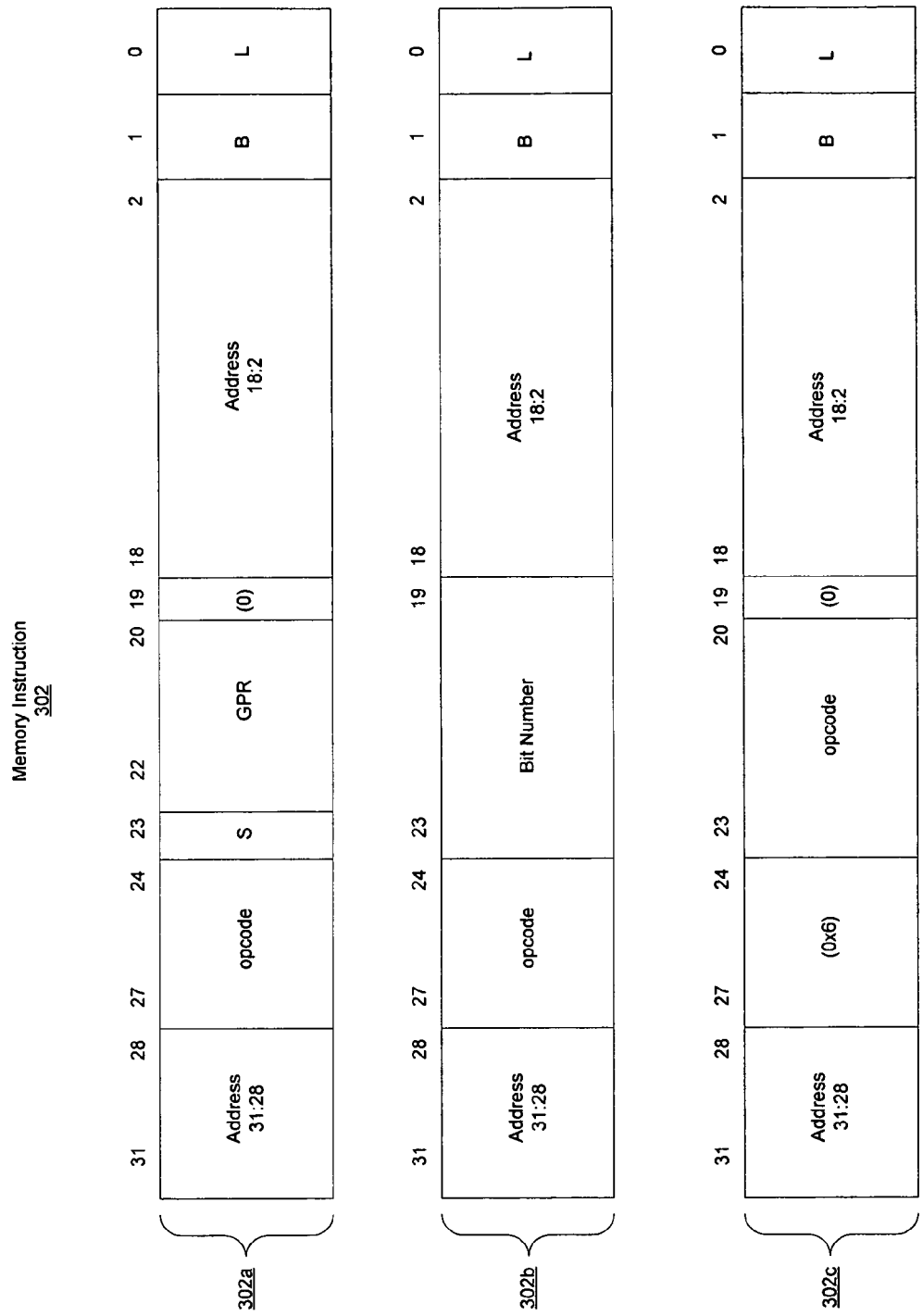
FIG. 3a is a diagram of exemplary memory access instructions in PCI format, in accordance with an embodiment of the invention.

FIG. 3a is a diagram of exemplary memory access instructions in PCI format, in accordance with an embodiment of the invention. Referring to FIG. 3a, there is shown three types of memory instructions 302a, 302b, and 302c, where the bit definitions for the three types may be different. With respect to the memory instruction 302a, the bits 31:28 and 18:2 may be address bits 31:28 and 18:2, respectively, of a memory location. The bits 27:24 may be opcode bits, the bit 23 may be a S bit, the bits 22:20 may specify a GPR, the bit 19 may be set to 0, the bit 1 may be a B bit, and the bit O may be a L bit.

The S bit may be asserted to indicate a store operation. If the operation is in a loop, the B bit may be asserted to indicate that the operation may break out of a loop. The L bit may be asserted to indicate that the operation may execute in a loop.

If the opcode bits 27:24 is 0x0, the memory instruction 302a may be a _Read instruction. When the processor 210 decodes and executes this instruction, contents of the memory location specified by the address in the bits 31:28 and 18:2 may be stored, for example, in the GPR specified by the bits 22:20. If the S bit is not asserted, the _Read operation may be finished. If the S bit is set, then the _Read operation may execute a write-verify operation. The write-verify operation may comprise a write operation and a verify operation. In the write operation, data may be written to the memory location specified by the address in the bits 31:28 and 18:2. For example, the contents of the GPR specified by the bits 22:20 may be written to the memory location specified by the address in the bits 31:28 and 18:2.

The verify operation may determine whether the L bit is asserted. If the L bit is not asserted, the write-verify operation may terminate. Otherwise, the data in the specified GPR may be compared to the data at the specified memory location. If the data are the same, the write-verify operation may terminate. Otherwise, the B bit may be checked to determine whether it is asserted. If the B bit is not asserted, the write-verify operation may repeat. If the B bit is asserted and if the write-verify operation has been executing, for example, for 1 second or less, the write-verify operation may repeat. Otherwise, if the B bit is asserted and the write-verify operation has been executing for more than 1 second, the write-verify operation may terminate.

If the opcode bits 27:24 is 0x1, the memory instruction 302a may be an _And_Or instruction. The _And_Or instruction may be a three-word instruction. The second word may be AND-data and the third word may be OR-data. When the processor 210 decodes and executes this instruction, the contents of the memory address specified by the bits 31:28 and 18:2 may be ANDed with the AND-data in the second word of the _And_Or instruction. The resulting data may be ORed with the OR-data in the third word of the _And_Or instruction. If the S bit is not asserted, the _And_Or operation may be finished. If the S bit is asserted, the _And_Or operation may execute the write-verify operation.

If the opcode bits 27:24 is 0x2, the memory instruction 302a may indicate a _Store instruction. When the processor 210 decodes and executes this instruction, the data in the GPR specified by the bits 22:20 may be written to a memory location specified by the bits 31:28 and 18:2. The _Store instruction may execute the write-verify operation regardless of the value of the S bit.

With respect to the memory instruction 302b, the bits 31:28 and 18:2 may be the address bits 31:28 and 18:2, respectively. The bits 27:24 may be the opcode bits, the bits 23:19 may specify a bit in a 32-bit word, the bit 1 may be the B bit, and the bit 0 may be a L bit. If the opcode bits 27:24 is 0x3, the memory instruction 302b may be a _Set_Bit instruction. When the processor 210 decodes and executes this instruction, a bit specified by the bits 23:19 in a word specified by the address bits 31:28 and 18:2 may be set to a 1. The B and L bits may be used for write-verify operation. If the opcode bits 27:24 is 0x4, the memory instruction 302b may be a _Clear_Bit instruction. When the processor 210 decodes and executes this instruction, a bit specified by the bits 23:19 in a word specified by the address bits 31:28 and 18:2 may be cleared to a 0. The B and L bits may be used for write-verify operation.

If the opcode bits 27:24 is 0x5, the memory instruction 302b may be a _Toggle_Bit instruction. When the processor 210 decodes and executes this instruction, a bit specified by the bits 23:19 in a word specified by the address bits 31:28 and 18:2 may be toggled. For example, if the specified bit is a 0, that bit may be toggled to a 1. If the specified bit is a 1, that bit may be toggled to a 0. The B and L bits may be used for write-verify operation.

With respect to the memory instruction 302c, the bits 31:28 and 18:2 may be the address bits 31:28 and 18:2, respectively. The bits 27:20 may be the opcode bits, the bit 19 may be a 0, the bit 1 may be the B bit, and the bit 0 may be a L bit. If the opcode bits 27:20 is 0x60, the memory instruction 302c may be a _Not instruction. When the processor 210 decodes and executes this instruction, each of the 32 bits in a word specified by the address bits 31:28 and 18:2 may be toggled. The B and L bits may be used for write-verify operation. If the opcode bits 27:20 is 0x61, the memory instruction 302c may be a _Write instruction. The _Write instruction may be a two-word instruction, in which the second word may be a 32-bit data. When the processor 210 decodes and executes this instruction, the 32-bit data in the second word may be written to a memory location specified by the address in the bits 31:28 and 18:2. The B and L bits may be used for write-verify operation.

If the opcode bits 27:20 is 0x62, the memory instruction 302c may be a _Or instruction. The _Or instruction may be a two-word instruction, in which the second word may be a 32-bit data. When the processor 210 decodes and executes this instruction, the 32-bit data in the second word may be ORed with the word at the memory location specified by the address bits 31:28 and 18:2. The result of the OR operation may be stored, for example, at the same memory location. The B and L bits may be used for write-verify operation.

If the opcode bits 27:20 is 0x63, the memory instruction 302c may be an _And instruction. The _And instruction may be a two-word instruction, in which the second word may be a 32-bit data. When the processor 210 decodes and executes this instruction, the 32-bit data in the second word may be ANDed with the word at the memory location specified by the address bits 31:28 and 18:2. The result of the AND operation may be stored, for example, at the same memory location. The B and L bits may be used for write-verify operation.

If the opcode bits 27:20 is 0x64, the memory instruction 302c may be a _Xor instruction. The _Xor instruction may be a two-word instruction, in which the second word may be a 32-bit data that. When the processor 210 decodes and executes this instruction, the 32-bit data in the second word may be XORed with the word at the memory location specified by the address bits 31:28 and 18:2. The result of the XOR operation may be stored, for example, at the same memory location. The B and L bits may be used for write-verify operation.

Figure 3B:
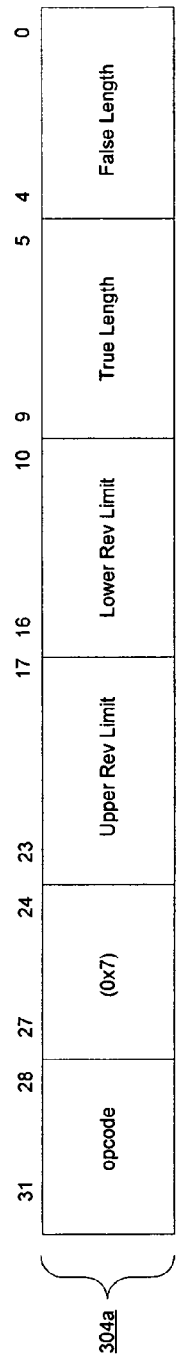
FIG. 3b is a diagram of an exemplary set of extended instructions in PCI format, in accordance with an embodiment of the invention.
Figure 3B:
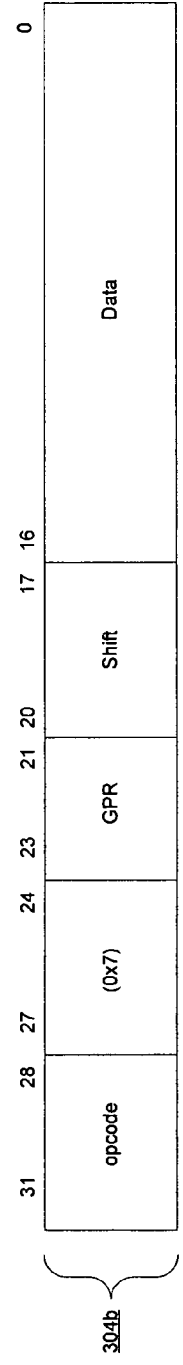
Figure 3B:
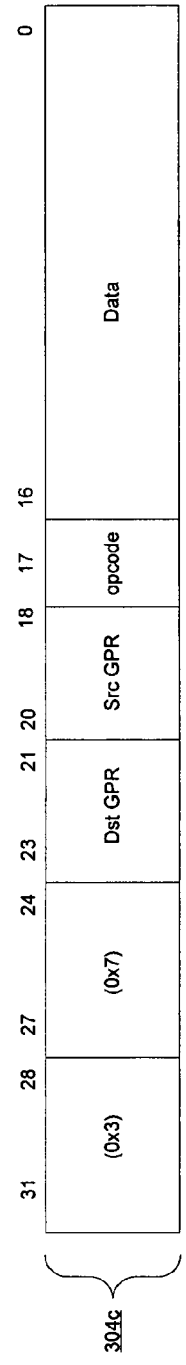
Figure 3B:
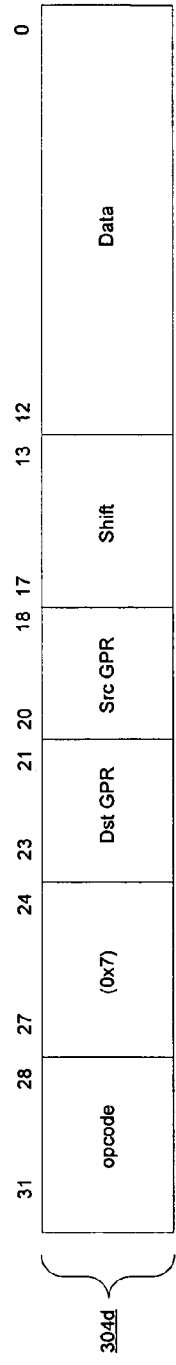

FIG. 3b is a diagram of an exemplary set of extended instructions in PCI format, in accordance with an embodiment of the invention. Referring to FIG. 3b, there is shown four types of extended instructions 304a, 304b, 304c, and 304d, where the bit definitions for the four types may be different. The extended instruction 304a may be a _If_Rev instruction, where the bits 31:24 may be 0x07. The bits 23:17 may specify a upper revision limit, and the bits 16:10 may specify a lower revision limit. The bits 9:5 may specify a true-length number and the bits 4:0 may specify a false-length number. The true-length number and the false-length number may specify a number of 32-bit words. The true-length number may specify the number of words to be executed on a true condition and the false-length number may specify a number of words to be executed on a false condition.

When the processor 210 decodes and executes this instruction, a revision number, for example, in the GPR7, may be examined to determine whether the revision number is less than or equal to the upper revision limit, and whether the revision number is greater than or equal to the lower revision limit. If the revision number is less than or equal to the upper revision limit and the revision number is greater than or equal to the lower revision limit, the next true-length number of words of instructions may be executed, and the subsequent false-length number of words of instructions may be skipped. If not, the next true-length number of words of instructions may be skipped, and the subsequent false-length number of words of instructions may be executed.

With respect to the memory instruction 304b, the bits 31:28 may be the opcode, the bits 27:24 may be 0x7, the bits 23:21 may specify GPR bits, the bits 20:17 may be shift bits, and the bits 16:0 may be data. If the opcode bits 31:28 is 0x1, the extended instruction 304b may be a _GPR_LoadI instruction. The data in the bits 16:0 may be shifted by the number of bits indicated by the shift bits 20:17, and the result may be stored, for example, in the GPR specified by the GPR bits 23:21.

If the opcode bits 31:28 is 0x2, the extended instruction 304b may be a _GPR_Cmpl instruction. When the processor 210 decodes and executes this instruction, the data in the GPR specified by the GPR bits 23:21 may be compared to the data in the bits 16:0. This may be used to set appropriate compare flags in the processor 105, which may be, for example, a MIPS processor. The compare flags may be, for example, greater-than (GT) flag, equal-to (EQ) flag, and less-than (LT) flag. The GT flag may be set if the data in the GPR is greater than the data in the bits 16:0. Similarly, the LT flag may be set if the data in the GPR is less than the data in the bits 16:0. If the two data are the same, the EQ flag may be set.

With respect to the memory instruction 304c, the bits 31:24 may be 0x37, the bits 23:21 may be destination GPR bits, the bits 20:18 may be source GPR bits, the bit 17 may be the opcode, and the bits 16:0 may be data. If the opcode bit 17 is 0x0, the extended instruction 304b may be a _GPR_AddI instruction. When the processor 210 decodes and executes this instruction, the data in the bits 16:0 may added to data in the GPR specified by the source GPR bits 20:18, and the result may be stored, for example, in the GPR specified by the destination GPR bits 23:21.

If the opcode bit 17 is 0x1, the extended instruction 304c may be _GPR_SubI instruction. When the processor 210 decodes and executes this instruction, the data in the bits 16:0 may subtracted from data in the GPR specified by the source GPR bits 20:18, and the result may be stored, for example, in the GPR specified by the destination GPR bits 23:21.

With respect to the memory instruction 304d, the bits 31:28 may be the opcode, the bits 27:24 may be 0x7, the bits 23:21 may be the destination GPR bits, the bits 20:18 may be the source GPR bits, the bits 17:13 may be the shift bits, and the bits 12:0 may be data. If the opcode bits 31:28 is 0x4, the extended instruction 304d may be _GPR_Clear_Bit instruction. When the processor 210 decodes and executes this instruction, the processor 210 may clear the bits indicated by the data bits 12:0. For example, the indicated bits in the data bits 12:0 may be set to logic 1s. The bits 12:0 may be inverted and then shifted by the number of bits indicated by the shift bits 17:13. The shifted bits may be ANDed with the data in the GPR specified by the source GPR bits 20:18. The resulting data may be stored, for example, in the GPR specified by the destination GPR bits 23:21.

If the opcode bits 31:28 is 0x5, the extended instruction 304d may be a _GPR_Set_Bit instruction. When the processor 210 decodes and executes this instruction, the processor 210 may set the bits that are indicated by the data bits 12:0 to be set. For example, the indicated bits in the data bits 12:0 may be set to 1s. The data in the bits 12:0 may be shifted by the number of bits indicated by the shift bits 17:13. The shifted bits may be ORed with the data in the GPR specified by the source GPR bits 20:18. The resulting data may be stored, for example, in the GPR specified by the destination GPR bits 23:21.

If the opcode bits 31:28 is 0x5, the extended instruction 304d may be a _GPR_Toggle_BIT instruction. When the processor 210 decodes and executes this instruction, the processor 210 may toggle the bits that are indicated by the data bits 12:0 to be toggled. For example, the indicated bits in the data bits 12:0 may be set to logic 1 s. The data in the bits 12:0 may be shifted by the number of bits indicated by the shift bits 17:13. The shifted bits may be XORed with the data in the GPR specified by the source GPR bits 20:18. The resulting data may be stored, for example, in the GPR specified by the destination GPR bits 23:21.

Figure 3C:
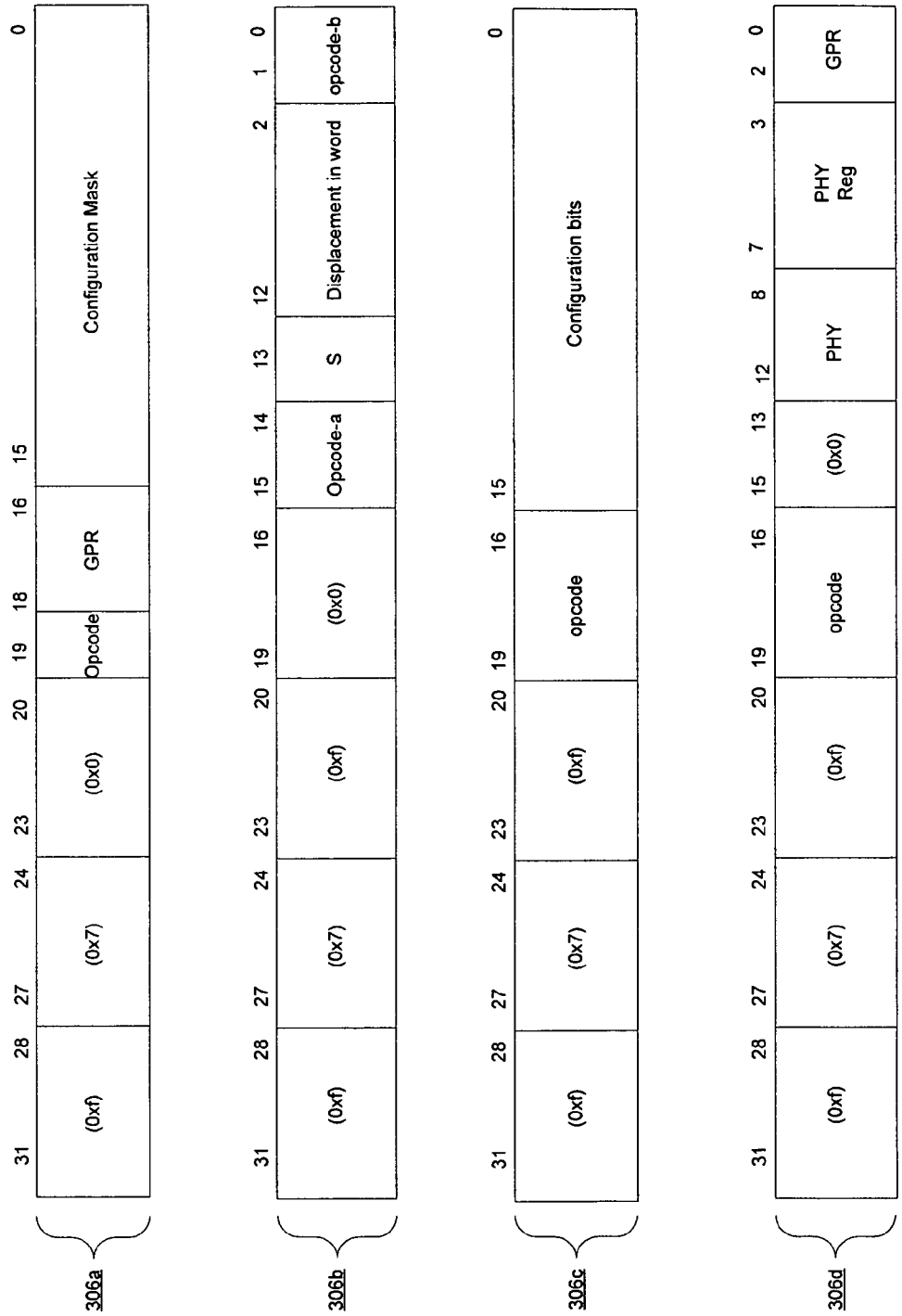
FIG. 3c is a diagram of an exemplary set of extended instructions in PCI format, in accordance with an embodiment of the invention.

FIG. 3c is a diagram of an exemplary set of extended instructions in PCI format, in accordance with an embodiment of the invention. Referring to FIG. 3c, there is shown four types of extended instructions 306a, 306b, 306c, and 306d, where the bit definitions for the four types may be different. With respect to the extended instruction 306a, the bits 31:20 may be 0xF70. The bit 19 may be the opcode bit, the bits 18:16 may be the GPR bits, and the bits 15:0 may be the data bits, for example.

If the opcode bit 19 is 0x0, the extended instruction 304d may be a _Get_Cfg instruction. When the processor 210 decodes and executes this instruction, data from a configuration register, which may be a register or a memory location with configuration bits, may be ANDed with the configuration mask in the data bits 15:0. The result of the AND operation may be stored, for example, in the GPR specified by the GPR bits 18:16.

If the opcode bit 19 is 0x1, the extended instruction 304d may be a _If_Cfg instruction. When the processor 210 decodes and executes this instruction, data from a configuration register may be ANDed with the configuration mask in the data bits 15:0. If the result of the AND operation is not equal to zero, the next instruction may be executed. Otherwise, the next instruction may be skipped.

With respect to the extended instruction 306b, the bits 31:16 may be 0xF7F0, the bits 15:14 and 1:0 may be four opcode bits, the bit 13 may be the S bit, and the bits 12:2 may be displacement in 32-bit words. If the opcode bits 15:14 and 1:0 is 0x0, the extended instruction 306b may be a _Jump instruction. When the processor 210 decodes and executes this instruction, the result may be an unconditional jump. An address in a program counter may be incremented by the displacement in the bits 12:2.

If the opcode bits 15:14 and 1:0 is 0x1, the extended instruction 306b may be a _Jump_EQ instruction. When the processor 210 decodes and executes this instruction, the result may be a conditional jump. The address in a program counter may be incremented by the displacement in the bits 12:2 if the EQ flag in the processor 105 is set. The processor 105 may be, for example, a MIPS processor.

If the opcode bits 15:14 and 1:0 is 0x2, the extended instruction 306b may be a _Jump_GT instruction. When the processor 210 decodes and executes this instruction, the result may be a conditional jump. The address in a program counter may be incremented by the displacement in the bits 12:2 if a GT flag is set.

If the opcode bits 15:14 and 1:0 is 0x3, the extended instruction 306b may be a _Jump_GE instruction. When the processor 210 decodes and executes this instruction, the result may be a conditional jump. The address in a program counter may be incremented by the displacement in the bits 12:2 if the EQ flag or the GT flag is set.

If the opcode bits 15:14 and 1:0 is 0x4, the extended instruction 306b may be a _Jump_LT instruction. When the processor 210 decodes and executes this instruction, the result may be a conditional jump. The address in a program counter may be incremented by the displacement in the bits 12:2 if the LT flag is set.

If the opcode bits 15:14 and 1:0 is 0x5, the extended instruction 306b may be a _Jump_LE instruction. When the processor 210 decodes and executes this instruction, the result may be a conditional jump. The address in a program counter may be incremented by the displacement in the bits 12:2 if the EQ flag or the LT flag is set.

If the opcode bits 15:14 and 1:0 is 0x6, the extended instruction 306b may be a _Jump_NEQ instruction. When the processor 210 decodes and executes this instruction, the result may be a conditional jump. The address in a program counter may be incremented by the displacement in the bits 12:2 if the EQ flag is not set.

With respect to the extended instruction 306c, the bits 31:20 may be 0xF7F, the bits 19:16 may be the opcode bits, and the bits 15:0 may be data bits. If the opcode bits 19:16 is 0x1, the extended instruction 306b may be a _Set_Cfg instruction. When the processor 210 decodes and executes this instruction, data from the configuration register may be ORed with the data bits in the bits 15:0. The result of the OR operation may be stored, for example, in the configuration register.

If the opcode bits 19:16 is 0x2, the extended instruction 306b may be a _Clear_Cfg instruction. When the processor 210 decodes and executes this instruction, data in the data bits 15:0 may be inverted, and the inverted bits may be ANDed with the data from the configuration register. The result of the AND operation may be stored, for example, in the configuration register.

With respect to the extended instruction 306d, the bits 31:20 may be 0xF7F, the bits 19:16 may be the opcode, the bits 15:13 may be zeros, the bits 12:8 may be PHY bits, the bits 7:3 may be PHY register bits, and the bits 2:0 may be the GPR bits. If the opcode bits 19:16 is 0x3, the extended instruction 306d may be a _GPR_MII_Read instruction. The _GPR_MII_Read instruction may be used to read data from a physical network interface layer (PHY) such as, for example, the PHY 202. When the processor 210 decodes and executes this instruction, the processor 210 may read data from a PHY register in the PHY. The PHY may be specified by the PHY bits 12:8 and the PHY register may be specified by the PHY register bits 7:3. The data read may be stored, for example, in the GPR specified by the GPR bits 2:0.

If the opcode bits 19:16 is 0x4, the extended instruction 306d may be a _GPR_MII_Write instruction. The _GPR_MII_Write instruction may be used to read data from, for example, the PHY 202. When the processor 210 decodes and executes this instruction, the processor 210 may write data to a PHY register in a PHY. The PHY may be specified by the PHY bits 12:8 and the PHY register may be specified by the PHY register bits 7:3. The data to be written may be read from the GPR specified by the GPR bits 2:0.

FIG. 3d is a diagram of an exemplary set of extended instructions in PCI format, in accordance with an embodiment of the invention. Referring to FIG. 3d, there is shown four types of extended instructions 308a, 308b, 308c, and 308d, where the bit definitions for the four types may be different. With respect to the extended instruction 308a, the bits 31:12 may be 0xF7FF0, the bit 11 may be the opcode bits, the bits 10:6 may be the shift bits, the bits 5:3 may be the destination GPR bits, and the bits 2:0 may be source GPR bits.

If the opcode bit 11 is 0x0, the extended instruction 308a may be a _GPR_Shift_Left instruction. When the processor 210 decodes and executes this instruction, the data in the GPR specified by the source GPR bits 2:0 may be shifted left by the number of bits indicated by the bits in the shift bits 10:6. The shifted data may be stored, for example, in the GPR specified by the destination GPR bits 5:3.

If the opcode bit 11 is 0x1, the extended instruction 308a may be a _GPR_Shift_Right instruction. When the processor 210 decodes and executes this instruction, the data in the GPR specified by the source GPR bits 2:0 may be shifted right by the number of bits indicated by the bits in the shift bits 10:6. The shifted data may be stored, for example, in the GPR specified by the destination GPR bits 5:3.

The extended instruction 308b may be a _Delay instruction. The bits 31:12 may be 0xF7FF1 and the bits 11:0 may specify time delay in microseconds. When the processor 210 decodes and executes this instruction, further execution of subsequent instructions by the processor 210 may be delayed by the time delay specified in the bits 11:0.

The extend instruction 308c may be a _Blink instruction. The bits 31:12 may be 0xF7FF1, the bits 11:8 may specify a frequency or a rate at which an LED may blink, and the bits 7:0 may specify a number of times to blink. When the processor 210 decodes and executes this instruction, the LED may blink for the specified number of times at the specified blink rate.

With respect to the extended instruction 308d, the bits 31:12 may be 0xF7FFF, the bits 11:6 may be the opcode bits, the bits 5:3 may be the destination GPR bits, and the bits 2:0 may be the source GPR bits. If the opcode bits 11:6 is 0x00, the instruction 308d may be a _GPR_Mov. When the processor 210 decodes and executes this instruction, data in the GPR specified by the source GPR bits 2:0 may be copied by the processor 210 to, for example, the GPR specified by the destination GPR bits 5:3.

If the opcode bits 11:6 is 0x01, the instruction 308d may be a _GPR_Add that may be a two-word instruction. The second word of the instruction _GPR_Add may be 32-bit data. When the processor 210 decodes and executes this instruction, 32-bit data in the second word may be added to data in the GPR specified by the source GPR bits 2:0. The sum may be stored, for example, in the GPR specified by the destination GPR bits 5:3.

If the opcode bits 11:6 is 0x02, the instruction 308d may be a _GPR_And that may be a two-word instruction. The second word of the instruction _GPR_And may be 32-bit data. When the processor 210 decodes and executes this instruction, 32-bit data in the second word may be ANDed to the data in the GPR specified by the source GPR bits 2:0. The result may be stored, for example, in the GPR specified by the destination GPR bits 5:3.

If the opcode bits 11:6 is 0x03, the instruction 308d may be _GPR_Or that may be a two-word instruction. The second word of the instruction a _GPR_Or may be 32-bit data. When the processor 210 decodes and executes this instruction, the 32-bit data in the second word may be ORed to the data in the GPR specified by the source GPR bits 2:0. The result may be stored, for example, in the GPR specified by the destination GPR bits 5:3.

If the opcode bits 11:6 is 0x04, the instruction 308d may be _GPR_Xor that may be a two-word instruction. The second word of the instruction a _GPR_Xor may be 32-bit data. When the processor 210 decodes and executes this instruction, the 32-bit data in the second word may be XORed to data in the GPR specified by the source GPR bits 2:0. The result may be stored, for example, in the GPR specified by the destination GPR bits 5:3.

If the opcode bits 11:6 is 0x05, the instruction 308*d* may be _GPR_Sub that may be a two-word instruction. The second word of the instruction _GPR_Sub may be 32-bit data. When the processor 210 decodes and executes this instruction, the 32-bit data in the second word may be subtracted from the data in the GPR specified by the source GPR bits 2:0. The result may be stored, for example, in the GPR specified by the destination GPR bits 5:3.

If the opcode bits 11:6 is 0x06, the instruction 308*d* may be _GPR_Cmp. When the processor 210 decodes and executes this instruction, a first number in the GPR specified by the destination GPR bits 5:3 may be compared with a second number in the GPR specified by the source GPR bits 2:0. This may result in setting of appropriate compare flags in the processor 105, which may be, for example, a MIPS processor. The greater-than (GT) flag may be set if the first number is greater than the second number. Similarly, the less-than (LT) flag may be set if the first number is less than the second number. If the two data are the same, the equal-to (EQ) flag may be set.

Figure 3E:
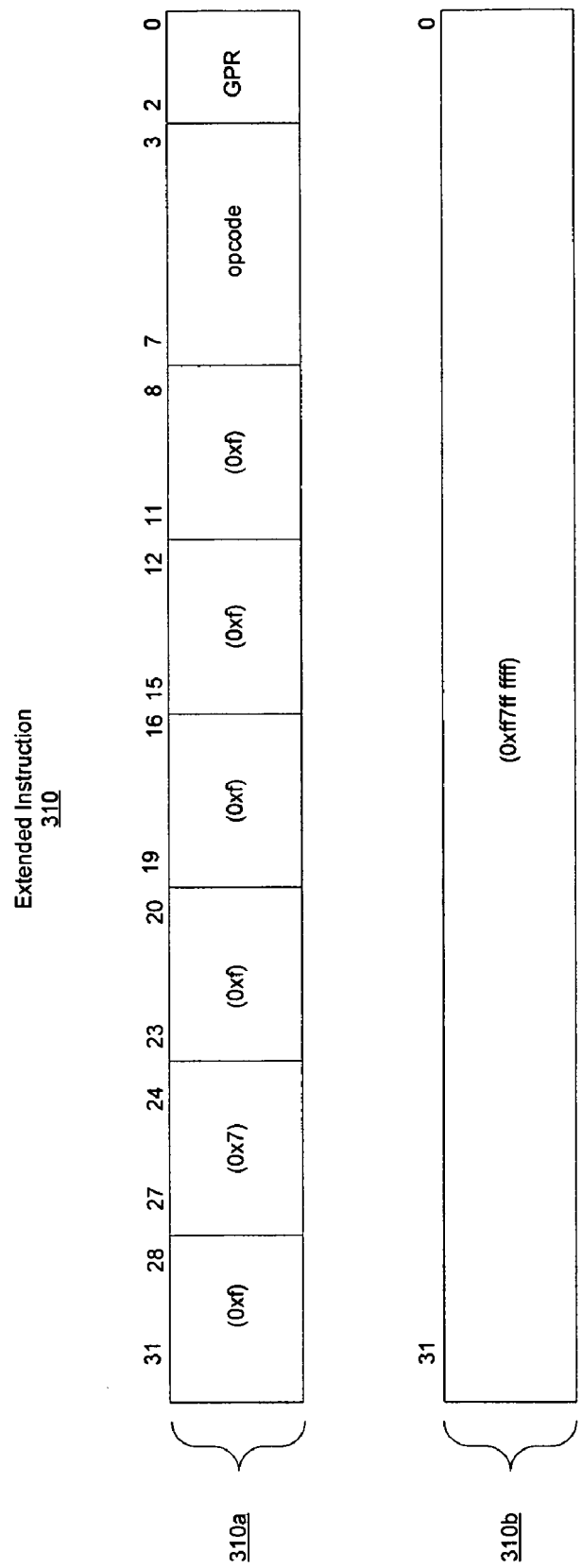
FIG. 3e is a diagram of an exemplary set of extended instructions in PCI format, in accordance with an embodiment of the invention.

FIG. 3*e* is a diagram of an exemplary set of extended instructions in PCI format, in accordance with an embodiment of the invention. Referring to FIG. 3*e*, there is shown various different types of extended instructions 310*a* and 310*b* comprising different bit definitions. With respect to the extended instruction 310*a*, the bits 31:8 may be 0xF7FFFF, the bits 7:3 may be the opcode bits, and the bits 2:0 may be the GPR bits. If the opcode bits 7:3 is 0x00, the instruction 310*a* may be a _GPR_Load instruction, which may be a two-word instruction. The second word may be 32-bit data. When the processor 210 decodes and executes this instruction, the 32-bit data in the second word of the instruction may be stored in, for example, the GPR specified by the GPR bits 2:0.

If the opcode bits 7:3 is 0x01, the instruction 310*a* may be a _GPR_Cmp_Data instruction that may be, for example, a two-word instruction. The second word may be 32-bit data, for example. When the processor 210 decodes and executes this instruction, the number in the GPR specified by the GPR bits 2:0 may be compared to the 32-bit number in the second word of the instruction. This may result in the setting of appropriate compare flags in the processor 105, which may be, for example, a MIPS processor. The compare flags may be, for example, greater-than (GT) flag, equal-to (EQ) flag, and less-than (LT) flag.

If the opcode bits 7:3 is 0x02, the instruction 310*a* may be a _GPR_Not instruction. When the processor 210 decodes and executes this instruction, the bits in the GPR specified by the GPR bits 2:0 may be inverted. The inverted bits may be stored, for example, in the same GPR.

If the opcode bits 7:3 is 0x03, the instruction 310*a* may be a _GPR_Bswap instruction. When the processor 210 decodes and executes this instruction, data bytes in the GPR specified by the GPR bits 2:0 may be swapped. For example, the least significant byte may be swapped with the most significant byte, and the second most significant byte may be swapped with the 3$^{rd}$ most significant byte. Accordingly, the data in the GPR may be converted from little-endian format to big-endian format, or vice versa. The data with the swapped bytes may be stored, for example, in the same GPR.

The instruction 310*b* may be a _Halt instruction where the bits 31:0 may be 0xF7FFFFFF. When the processor 210 decodes and executes this instruction, the processor 210 may halt execution of instructions.

Figure 3F:
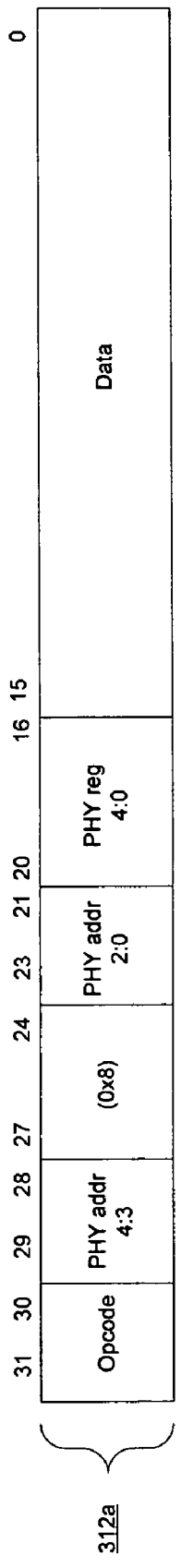
FIG. 3f is a diagram of exemplary MII access instructions in PCI format, in accordance with an embodiment of the invention.
Figure 3F:
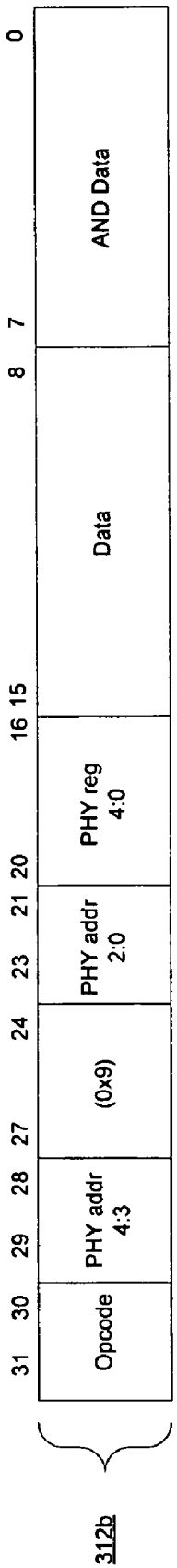

FIG. 3*f* is a diagram of exemplary MII access instructions in PCI format, in accordance with an embodiment of the invention. Referring to FIG. 3*f*, there is shown various different types of MII access instructions 312*a* and 312*b* comprising different bit definitions. With respect to the MII access instruction 312*a*, the bits 31:30 may be the opcode bits, the bits 29:28 and 23:21 may be five bits that specify a PHY, the bits 27:24 may be 0x8, the bits 20:16 may be five bits that specify the PHY register, and the bits 15:0 may be data.

If the opcode bits 31:30 is 0x0, the MII access instruction 312*a* may be a _MII_Write instruction. When the processor 210 decodes and executes this instruction, the data in the bits 15:0 may be written to the PHY register specified by the bits 20:16 in the PHY specified by the five bits 29:28 and 23:21.

If the opcode bits 31:30 is 0x1, the MII access instruction 312*a* may be a _MI_Or instruction. When the processor 210 decodes and executes this instruction, the data in the bits 15:0 may be ORed with the data in the PHY register specified by the bits 20:16 in the PHY specified by the five bits 29:28 and 23:21. The result of the OR operation may be stored, for example, in the same PHY register.

If the opcode bits 31:30 is 0x2, the MII access instruction 312*a* may be a _MII_And instruction. When the processor 210 decodes and executes this instruction, the data in the bits 15:0 may be ANDed with the data in the PHY register specified by the bits 20:16 in the PHY specified by the five bits 29:28 and 23:21. The result of the AND operation may be stored, for example, in the same PHY register.

If the opcode bits 31:30 is 0x3, the MII access instruction 312*a* may be a _MII_Xor instruction. When the processor 210 decodes and executes this instruction, the data in the bits 15:0 may be XORed with the data in the PHY register specified by the bits 20:16 in the PHY specified by the five bits 29:28 and 23:21. The result of the XOR operation may be stored, for example, in the same PHY register.

With respect to the MII access instruction 312*b*, bits 31:30 may be the opcode bits, bits 29:28 and 23:21 may be five bits that specify a PHY, bits 27:24 may be 0x9, bits 20:16 may be five bits that specify the PHY register, bits 15:8 may be first data, and bits 7:0 may be AND data.

If the opcode bits 31:30 is 0x0, the MII access instruction 312*b* may be a _MII_And_Or_Low instruction. When the processor 210 decodes and executes this instruction, the AND data in bits 7:0 may be ORed with 0xFF00. The result of the OR operation may be ANDed with data in the PHY register specified by the bits 20:16 in the PHY specified by bits 29:28 and 23:21. The result of the AND operation may be ORed with the first data in the bits 15:8. The result of the second OR operation may be stored, for example, in the same PHY register.

If the opcode bits 31:30 is 0x1, the MII access instruction 312*b* may be a _MII_And_Or_High instruction. When the processor 210 decodes and executes this instruction, the AND data in bits 7:0 may be shifted left by eight bits. The result of the shifted data may be ORed with 0xFF. The result of the OR operation may be ANDed with data in the PHY register specified by the bits 20:16 in the PHY specified by bits 29:28 and 23:21. The result of the AND operation may be ORed with the first data in bits 15:8 that may have been shifted left by eight bits. The result of the second OR operation may be stored, for example, in the same PHY register.

If the opcode bits 31:30 is 0x2, the MII access instruction 312*b* may be a _MII_If_Low instruction. When the processor 210 decodes and executes this instruction, the data in the PHY register specified by bits 20:16 in the PHY specified by bits 29:28 and 23:21 may be ANDed with the AND data in bits 7:0. The result of the AND operation may be compared to the first data in bits 15:8. If the two data are the same, the next single instruction may be executed. Otherwise, the next single instruction may be skipped.

If the opcode bits 31:30 is 0x3, the MII access instruction 312*b* may be a _MII_If_High instruction. When the processor 210 decodes and executes this instruction, the data in the PHY register specified by bits 20:16 in the PHY specified by bits 29:28 and 23:21 may be ANDed with the AND data in bits 7:0 that may have been shifted left by eight bits. The result of the AND operation may be compared to the first data in bits 15:8 that may be shifted left by eight bits. If the two data are the same, the next single instruction may be executed. Otherwise, the next single instruction may be skipped.

Figure 3G:
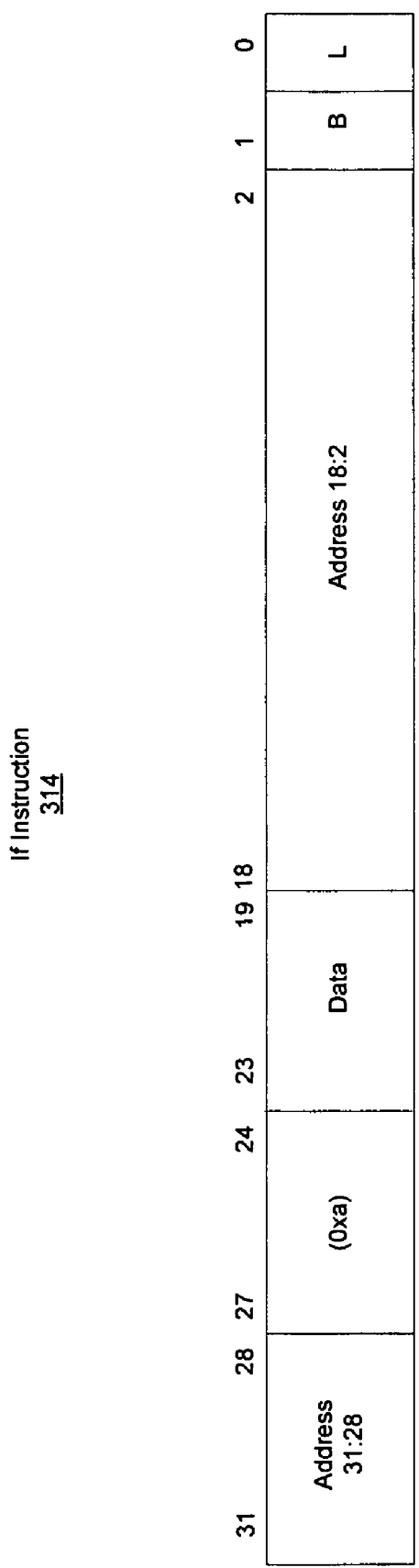
FIG. 3g is a diagram of exemplary If instructions in PCI format, in accordance with an embodiment of the invention.

FIG. 3*g* is a diagram of exemplary If instructions in PCI format, in accordance with an embodiment of the invention. Referring to FIG. 3*g*, there is shown If instructions 314. The if instructions 314 may comprise memory address in bits 31:28 and bits 18:2, opcode in bits 27:24, data in bits 23:19, B bit in bit 1, and L bit in bit 0.

If the opcode bits 27:24 is 0xA, the if instruction 314 may be an _If_Bit_Clear instruction. The data in bits 23:19 may indicate the number of bits to shift left. When the processor 210 decodes and executes this instruction, a Condition bit, for example, in a variable or a register, may be de-asserted. A while-loop may be executed next. In the while-loop, data at the memory location specified by bits 31:28 and 18:2 may be ANDed with a 1 shifted left by as indicated by bits 23:19. If the result of the AND is a 0, the Condition bit may be asserted and the while-loop may be exited.

If the result of the AND is a 1, the L bit may be examined. If the L bit is not asserted, the while-loop may be exited. If the L bit is asserted, the B bit may be examined. If the B bit is asserted and the while-loop has been executing for 1 second or less, the while-loop may continue. Otherwise, the while-loop may be exited. The Condition bit may be checked after exiting the while-loop. If the Condition bit is false, the next instruction may be skipped. Otherwise, the next instruction may be executed.

If the opcode bits 27:24 is 0xB, the if instruction 314 may be an _If_Bit_Set instruction. The data in the bits 23:19 may indicate the number of bits to shift left. When the processor 210 decodes and executes this instruction, a Condition bit, for example, in a variable or a register, may be de-asserted. A while-loop may be executed next. In the while-loop, data at the memory location specified by the address bits 31:28 and 18:2 may be ANDed with a 1 shifted left by as indicated by the bits 23:19. If the result of the AND operation is a 1, the Condition bit may be asserted and the while-loop may be exited.

If the result of the AND is a 0, the L bit may be examined. If the L bit is not asserted, the while-loop may be exited. If the L bit is asserted, the B bit may be examined. If the B bit is asserted and the while-loop has been executing for 1 second or less, the while-loop may continue. Otherwise, the while-loop may be exited. The Condition bit may be checked after exiting the while-loop. If the Condition bit is false, the next instruction may be skipped. Otherwise, the next instruction may be executed.

If the opcode bits 27:24 is 0xC, the if instruction 314 may be an _If_Upper_Data instruction. The _If_Upper_Data instruction may be a two-word instruction. The data in the bits 23:19 of the first word may be a true-length number. The bits 31:16 of the second word may be a first data, and the bits 15:0 may be a second data. When the processor 210 decodes and executes this instruction, a Condition bit, for example, in a variable or a register, may be de-asserted. A while-loop may be executed next. In the while-loop, data at the memory location specified by the address bits 31:28 and 18:2 may be ANDed with the second data that may have been shifted left by 16 bits. The result of the AND operation may be compared to the first data that may have been shifted left by 16 bits. If the two data are the same, the Condition bit may be asserted and the while-loop may be exited.

Otherwise, the L bit may be examined. If the L bit is not asserted, the while-loop may be exited. If the L bit is asserted, the B bit may be examined. If the B bit is asserted and the while-loop has been executing for 1 second or less, the while-loop may continue. Otherwise, the while-loop may be exited. The Condition bit may be checked after exiting the while-loop. If the Condition bit is false, the number of words specified by the true-length number may be skipped. Otherwise, the next instruction may be executed.

If the opcode bits 27:24 is 0xD, the if instruction 314 may be an _If_Lower_Data instruction. The _if_Lower_Data instruction may be a two-word instruction. The data in the bits 23:19 of the first word may be a true-length number. The bits 31:16 of the second word may be a first data, and the bits 15:0 may be a second data. When the processor 210 decodes and executes this instruction, a Condition bit, for example, in a variable or a register, may be de-asserted. A while-loop may be executed next. In the while-loop, data at the memory location specified by the address bits 31:28 and 18:2 may be ANDed with the second data. The result of the AND operation may be compared to the first data. If the two data are the same, the Condition bit may be asserted and the while-loop may be exited.

Otherwise, the L bit may be examined. If the L bit is not asserted, the while-loop may be exited. If the L bit is asserted, the B bit may be examined. If the B bit is asserted and the while-loop has been executing for 1 second or less, the while-loop may continue. Otherwise, the while-loop may be exited. The Condition bit may be checked after exiting the while-loop. If the Condition bit is false, the number of words specified by the true-length number may be skipped. Otherwise, the next instruction may be executed.

If the opcode bits 27:24 is 0xE, the If instruction 314 may be an _If_Byte_Data instruction. The_If_Byte_Data instruction may be a two-word instruction. The data in the bits 23:19 of the first word may indicate a number of bits to shift left. The bits 31:24 of the second word may be a false-length number, the bits 23:16 may be a true-length number, the bits 15:8 may be first data, and the bits 7:0 may be a second data. When the processor 210 decodes and executes this instruction, a Condition bit, for example, in a variable or a register, may be de-asserted. A while-loop may be executed next. In the while-loop, data at the memory location specified by the address bits 31:28 and 18:2 may be ANDed with the second data that may have been shifted by the number of bits indicated by the bits 23:19. The result of the AND operation may be compared to the first data that may have been shifted left by the number of bits indicated by the bits 23:19. If the two data are the same, the Condition bit may be asserted and the while-loop may be exited.

Otherwise, the L bit may be examined. If the L bit is not asserted, the while-loop may be exited. If the L bit is asserted, the B bit may be examined. If the B bit is asserted and the while-loop has been executing for 1 second or less, the while-loop may continue. Otherwise, the while-loop may be exited. The Condition bit may be checked after exiting the while-loop. If the Condition bit is true, the number of words indicated by the true-length number may be executed, and the subsequent number of words indicated by the false-length number may be skipped. If the Condition bit is false, the number of words indicated by the true-length number may be skipped, and the subsequent number of words indicated in the false-length number may be executed.

If the opcode bits 27:24 is 0xF, the if instruction 314 may be an _If_Data instruction. The _If_Data instruction may be a three-word instruction. The data in the bits 23:19 of the first word may be a true-length number. The second word may be a first data, and the third word may be a second data. When the processor 210 decodes and executes this instruction, a Condition bit, for example, in a variable or a register, may be de-asserted. A while-loop may be executed next. In the while-loop, data at the memory location specified by the address bits 31:28 and 18:2 may be ANDed with the first data. The result of the AND operation may be compared to the second data. If the two data are the same, the Condition bit may be asserted and the while-loop may be exited.

Otherwise, the L bit may be examined. If the L bit is not asserted, the while-loop may be exited. If the L bit is asserted, the B bit may be examined. If the B bit is asserted and the while-loop has been executing for 1 second or less, for example, the while-loop may continue. Otherwise, the while-loop may be exited. The Condition bit may be checked after exiting the while-loop. If the Condition bit is false, the number of words specified by the true-length number of the first word may be skipped. Otherwise, the next instruction may be executed.

In accordance with various embodiments of the invention, macros may be used for the instructions described above. The macros may be converted to the PCI format instructions during code compilation. Some exemplary macros are listed in Table 1 below. The macros may need parameters for particular bits of an instruction. For example, the macro M_READ may have a parameter "addr" that may comprise data for the address bits 31:28 and 18:2. These address bits may be written to the bits 31:28 and 18:2 of the _Read instruction. The GPR bits 22:20 of the _Read instruction may be defaulted to 0x7 for the macro M_READ. This may generate a PCI command to perform a read from the particular register. For example, if the macro M_READ is used with a parameter of 0x100000, M_READ (0x100000), the resulting _Read instruction may be 0x10700000. Accordingly, a word in the address location 0x10000000 may be read and stored, for example, in the GPR7. The S bit, the B bit, and the L bit may be zeros.

The macros may refer to similarly named PCI format instructions. For example, the M_READ and M_X_READ macros may refer to the _Read instruction. Various terms used in Parameter and function columns of the Table 1 is described below the table.

TABLE 1 list of macros

| Macro | Instruction | Parameter | Function |
| --- | --- | --- | --- |
| M_READ | _Read | addr | gpr7 = *addr19; |
| M_X_READ | _Read | gpr, addr, wop | gpr = *addr19; with write back operation |
| M_AND_OR | _And_Or | addr, and_data32, or_data32 | *addr19 = gpr7 = (*addr19 & and_data32) \| or_data32; |
| M_X_AND_OR | _And_Or | gpr, addr, and_data32, or_data32, wop | gpr = (*addr19 & and_data32) \| or_data32; with write back operation |
| M_SET_BIT | _Set_Bit | addr, bitnum5 | *addr18 \|= (1 << bitnum5); |
| M_X_SET_BIT | _Set_Bit | addr, bitnum5, vop | *addr18 \|= (1 << bitnum5); with verify operation |
| M_CLEAR_BIT | _Clear_Bit | addr, bitnum5 | *addr18 &= ~(1 << bitnum5); |
| M_X_CLEAR_BIT | _Clear_Bit | addr, bitnum5, vop | *addr18 &= ~(1 << bitnum5); with verify operation |
| M_TOGGLE_BIT | _Toggle_Bit | addr, bitnum5 | *addr18 ^= (1 << bitnum5); |
| M_X_TOGGLE_BIT | _Toggle_Bit | addr, bitnum5, vop | *addr18 ^= (1 << bitnum5); with verify operation |
| M_NOT | _Not | addr | *addr19 = ~*addr19; |
| M_X_NOT | _Not | addr, vop | *addr19 = ~*addr19; with verify operation |
| M_WRITE | _Write | addr, data32 | *addr19 = data32; |
| M_X_WRITE | _Write | addr, data32, vop | *addr19 = data32; with verify operation |
| M_OR | _Or | addr, data32 | *addr19 \|= data32 |
| M_X_OR | _Or | addr, data32, vop | *addr19 \|= data32, with verify operation |
| M_AND | _And | addr, data32 | *addr19 &= data32 |
| M_X_AND | _And | addr, data32, vop | *addr19 &= data32, with verify operation |
| M_XOR | _Xor | addr, data32 | *addr19 ^= data32 |
| M_X_XOR | _Xor | addr, data32, vop | *addr19 ^= data32, with verify operation |
| M_IF_REV <true case instructions> [M_ELSE <false case instructions>] M_END_IF | _If_Rev | URev7, LRev7 | If ((revision <= URev7) && (revision >= LRev7)) |
| M_GPR_LOADI | _GPR_LoadI | gpr, data17 | gpr = data17 |
| M_GPR_LOADI_SHIFT | _GPR_LoadI | gpr, data17, shift4 | gpr = data17 << shift4 |
| M_GPR_CMPI | _GPR_CmpI | gpr, data17 | compare(gpr, data17) |

TABLE 1-continued list of macros

| Macro | Instruction | Parameter | Function |
|---|---|---|---|
| M_GPR_CMPI_SHIFT | _GPR_Cmpl | gpr, data17, shift4 | compare(gpr, data17 << shift4) |
| M_GPR_ADDI | _GPR_Addi | dst, src, data17 | dst = src + data17 |
| M_GPR_SUBI | _GPR_Subl | dst, src, data17 | dst = src − data17 |
| M_GPR_CLEAR_BIT | _GPR_Clear_Bit | dst, src, bitnum5 | dst = src & ~(1 << bitnum5) |
| M_GPR_CLEAR_BITS | _GPR_Clear_Bit | dst, src, shift5, data13 | dst = src & ~(data13 << shift5) |
| M_GPR_SET_BIT | _GPR_Set_Bit | dst, src, bitnum5 | dst = src | (1 << bitnum5) |
| M_GPR_SET_BITS | _GPR_Set_Bit | dst, src, shift5, data13 | dst = src | (data13 << shift5) |
| M_GPR_TOGGLE_BIT | _GPR_Toggle_Bit | dst, src, bitnum5 | dst = src ^ (1 << bitnum5) |
| M_GPR_TOGGLE_BITS | _GPR_Toggle_Bit | dst, src, shift5, data13 | dst = src ^ (data13 << shift5) |
| M_IF_WOL | _If_Cfg | | if (config wol is enabled) |
| M_IF_WOL_SPEED10 | _If_Cfg | | if (config wol_speed10 is set) |
| M_IF_LOM | _If_Cfg | | if (config lom is set) |
| M_IF_AUTO_PWR_DOWN | _If_Cfg | | if (config auto_power_down is enabled) |
| M_IF_R_NWAY | _If_Cfg | | if (config reverse_n_way is set) |
| M_IF_DISABLE_PWR_SAVING | _If_Cfg | | if (config disable_power_saving is set) |
| M_GET_CFG | _Get_Cfg | gpr, mask16 | gpr = config & mask16 |
| M_SET_CFG | _Set_Cfg | mask16 | config |= mask16 |
| M_CLEAR_CFG | _Clear_Cfg | mask16 | config &= ~mask16 |
| M_JUMP | _Jump | label | jump to label |
| M_JUMP_EQ | _Jump_EQ | label | if EQ flag is set, then jump to label |
| M_JUMP_GT | _Jump_GT | label | if GT flag is set, then jump to label |
| M_JUMP_GE | _Jump_GE | label | if EQ or GT flag is set, then jump to label |
| M_JUMP_LT | _Jump_LT | label | if LT flag is set, then jump to label |
| M_JUMP_LE | _Jump_LE | label | if LT or EQ flag is set, then jump to label |
| M_JUMP_NEQ | _Jump_NEQ | label | if EQ flag is not set, then jump to label |
| M_GPR_SHIFT_LEFT | _GPR_Shift_Left | dst, src, shift5 | dst = src << shift5 |
| M_GPR_SHIFT_RIGHT | _GPR_Shift_Right | dst, src, shift5 | dst = src >> shift5 |
| M_DELAY | _Delay | time12 | wait_us(time12) |
| M_BLINK | _Blink | speed4, count8 | blink LED for count8 times at speed4, when count8 is zero, blink forever. speed4: 0:fastest, 15, slowest |
| M_GPR_MOV | _GPR_Mov | dst, src | dst = src |
| M_GPR_ADD | _GPR_Add | dst, src, data32 | dst = src + data32 |
| M_GPR_AND | _GPR_And | dst, src, data32 | dst = src & data32 |
| M_GPR_OR | _GPR_Or | dst, src, data32 | dst = src | data32 |
| M_GPR_XOR | _GPR_Xor | dst, src, data32 | dst = src ^ data32 |
| M_GPR_SUB | _GPR_Sub | dst, src, data32 | dst = src − data32 |
| M_GPR_CMP | _GPR_Cmp | dst, src | compare(dst, src) |
| M_GPR_LOAD | _GPR_Load | gpr, data32 | gpr = data32 |
| M_GPR_CMP_DATA | _GPR_Cmp_Data | gpr, data32 | compare(gpr, data32) |
| M_GPR_NOT | _GPR_Not | gpr | gpr = ~gpr |
| M_GPR_BSWAP | _GPR_Bswap | gpr | gpr = byte_swap(gpr) |
| M_GPR_MII_READ | _GPR_MII_Read | phy5, reg5, gpr | gpr = mii_reg(phy5, reg5); |
| M_GPR_MII_WRITE | _GPR_MII_Write | phy5, reg5, gpr | mii_reg(phy5, reg5, gpr); |
| M_HALT | _Halt | | Halt the CPU |
| M_MII_WRITE | _MII_Write | phy5, reg5, data16 | mii_reg(phy5, reg5) = data16 |
| M_MII_OR | _MII_Or | phy5, reg5, data16 | mii_reg(phy5, reg5) |= data16 |
| M_MII_AND | _MII_And | phy5, reg5, data16 | mii_reg(phy5, reg5) &= data16 |
| M_MII_XOR | _MII_Xor | phy5, reg5, data16 | mii_reg(phy5, reg5) &= data16 |
| M_MII_AND_OR_LOW | _MII_And_Or_Low | phy5, reg5, or_data8, and_data8 | Mii_reg(phy5, reg5) = ((mii_reg(phy5, reg5) & (0xFF00 | and_data8))) | or_data8 |
| M_MII_AND_OR_HIGH | _MII_And_Or_High | phy5, reg5, or_data8, and_data8 | Mii_reg(phy5, reg5) = ((mii_reg(phy5, reg5) & (0xFF | (and_data8 << 8))) | (or_data8 << 8) |

TABLE 1-continued list of macros

| Macro | Instruction | Parameter | Function |
|---|---|---|---|
| M_MII_IF_LOW | _MII_If_Low | phy5, reg5, eq_data8, and_data8 | if (((mii_reg(phy5, reg5) & and_data8) == eq_data8) |
| M_MII_IF_HIGH | _MII_If_High | phy5, reg5, eq_data8, and_data8 | if (((mii_reg(phy5, reg5) & (and_data8 << 8)) == (eq_data8 << 8)) |
| M_IF_BIT_CLEAR | _If_Bit_Clear | addr, bitnum5 | If (!(*addr18 & (1 << bitnum5))) |
| M_X_IF_BIT_CLEAR | _If_Bit_Clear | addr, bitnum5, wt_op | If (!(*addr18 & (1 << bitnum5))) with wait operation |
| M_IF_BIT_SET | _If_Bit_Set | addr, bitnum5 | If (*addr18 & (1 << bitnum5)) |
| M_X_IF_BIT_SET | _If_Bit_Set | addr, bitnum5, wt_op | If (*addr18 & (1 << bitnum5)) with wait operation |
| M_IF_UPPER_DATA <true case instructions> M_END_IF | _If_Upper_Data | addr, eq_data16, and_data16 | If ((*addr18 & (and_data16 << 16)) == (eq_data16 << 16)) |
| M_X_IF_UPPER_DATA <true case instructions> M_END_IF | _If_Upper_Data | addr, eq_data16, and_data16, wt_op | If ((*addr18 & (and_data16 << 16)) == (eq_data16 << 16)) with wait operation |
| M_IF_LOWER_DATA <true case instructions> M_END_IF | _If_Lower_Data | addr, eq_data16, and_data16 | If ((*addr18 & and_data16) == eq_data16) |
| M_X_IF_LOWER_DATA <true case instructions> M_END_IF | _If_Lower_Data | addr, eq_data16, and_data16, wt_op | if ((*addr18 & and_data16) == eq_data16) with wait operation |
| M_IF_BYTE_DATA <true case instructions> [M_ELSE <false case instructions>] M_END_IF | _If_Byte_Data | addr, shift5, eq_data8, and_data8 | if ((*addr18 & (and_data8 << shift5)) == (eq_data18 << shift5)) |
| M_X_IF_BYTE_DATA <true case instructions> [M_ELSE <false case instructions>] M_END_IF | _If_Byte_Data | addr18, shift5, eq_data8, and_data8 | if ((*addr18 & (and_data8 << shift5)) == (eq_data18 << shift5)) with wait operation |
| M_IF_DATA <true case instructions> M_END_IF | _If_Data | addr, eq_data32, and_data32 | if ((*addr18 & and_data32) == eq_data32) |
| M_X_IF_DATA <true case instructions> M_END_IF | _If_Data | addr, eq_data32, and_data32 | if ((*addr18 & and_data32) == eq_data32) with wait operation |

Macros may also be used for parameters. For example, a GPR may be referred by the following parameter macro:

GPRX: general purpose register x, where x is a value from 0 to N. For example, if there are eight GPRs, then N=7.

The parameter w_op may indicate a write operation and may use one of the following macros:

NO_WRITE_BACK: Do not write data back to the address.
WRITE_BACK: Write the data back to the address.
WRITE_BACK_VERIFY: Write the data back to the address and read back to verify. If the data cannot be verified, keep writing back data and trying to verify until a 1 second time out occurs.
WRITE_BACK_UTIL_VERIFIED: Write the data back to the address and read back to verify. If the data cannot be verified, keep trying to write data until successful verification occurs. This may cause the self-boot code to hang if a successful write cannot occur.

The parameter v_op may indicate a verify operation and may use one of the following macros:

NO_VERIFY: Do not verify after write.
VERIFY: Verify after write. If the data cannot be verified, keep trying to write data and verifying the data until a 1 second time out occurs.
LOOP_UNTIL_VERIFIED: Verify after write. If the data cannot be verified, keep trying to write data until successful verification occurs.

The parameter wt_op may indicate a wait operation and may use one of the following macros:

WAIT_UNTIL: Loop until the true condition is met.
WAIT_UNTIL_WITH_TIMEOUT: Loop until the true condition is met or 1 second timeout occurs.

In accordance with an embodiment of the invention, labels may be used for jump instructions. For example, labels LABEL00, . . . , LABELN may be used. The twentieth label, for example, may be LABEL19.

The following terms used in Table 1 are described below.

addr may be an address or a mask.

dataX, or _dataX, and _dataX, eq_dataX may be X-bit data. For example, if X is 32, these may be 32-bit data.

LRev7 and URev7 may be revision numbers.

Some of the PCI format instructions may be illustrated by an exemplary macro code sample below:

```
//Line1
    M_WRITE("0xE00","0x11223344");
    M_READ("0xE00");
//Line2
    M_X_STORE(GPR7,"0xE04",NO_VERIFY);
    M_GPR_LOAD(GPR2,"0x11223344");
//Line3
    M_GPR_CMP(GPR2,GPR7);
    M_JUMP_NEQ(LABEL02);
//Line4
    M_GPR_CMP_DATA(GPR7,"0x11223344");
    M_JUMP_EQ(LABEL00);
/* ERROR CONDITION */
LABEL02;
    M_BLINK("0","20");
    M_JUMP(LABEL01);
/* PASSING CONDITION */
LABEL00;
    M_BLINK("7","1");
LABEL01;
```

In the exemplary macro code, at line Line1, a write macro M_WRITE( ) may write a specified value 0x11223344 to a memory location specified by the address parameter 0xE00. The address parameter 0xE00 may specify a memory address 0xE0000000. A read instruction M_READ( ) may read data at a specified memory location 0xE0000000, and write the data read to a general purpose register 7 (GPR7).

At Line2, a store instruction M_X_STORE( ) may store data in a specified register GPR7 to a memory location specified by the address parameter 0xE04. The address parameter 0xE04 may specify a memory address 0xE000000. A load instruction M_GPR_LOAD( ) may load a specified register GPR2 with the specified value 0x11223344.

At Line3, a compare instruction M_GPR_CMP() may compare data in the specified registers GPR2 and GPR7. If the values of the two registers are not equal to each other, then the conditional jump instruction M_JUMP_NEQ() may indicate a jump to a line labelled LABEL02. At Line4, a compare instruction M_GPR_CMP_DATA( ) may compare data in the specified register GPR7 with the specified value 0x11223344. If the data in the register GPR7 is equal to the value 0x11223344, a conditional jump instruction M_JUMP_EQ( ) may indicate a jump to a line labelled LABEL00.

At a line specified by LABEL02, a blink instruction M_BLINK( ) may indicate to an LED, for example, the LED 248, to blink a specified number of times, for example, 20 times, at an indicated blink rate of 0. The next instruction may be M_JUMP( ), which may indicate an unconditional jump to an indicated line of LABEL01. At a line specified by the LABEL00, the blink instruction M_BLINK( ) may indicate to the LED 248 to blink a specified number of times, for example, once, at an indicated blink rate, for example, the blink rate of 7. The blink rates may be design and/or implementation dependent.

Source code written in C language for the MIPS processor may be significantly larger than the same functionality written using PCI format instructions. For example, a compiled code size of MIPS C source code may be 588 bytes, while the functionally same code written in PCI format macros may be 240 bytes.

Figure 4:
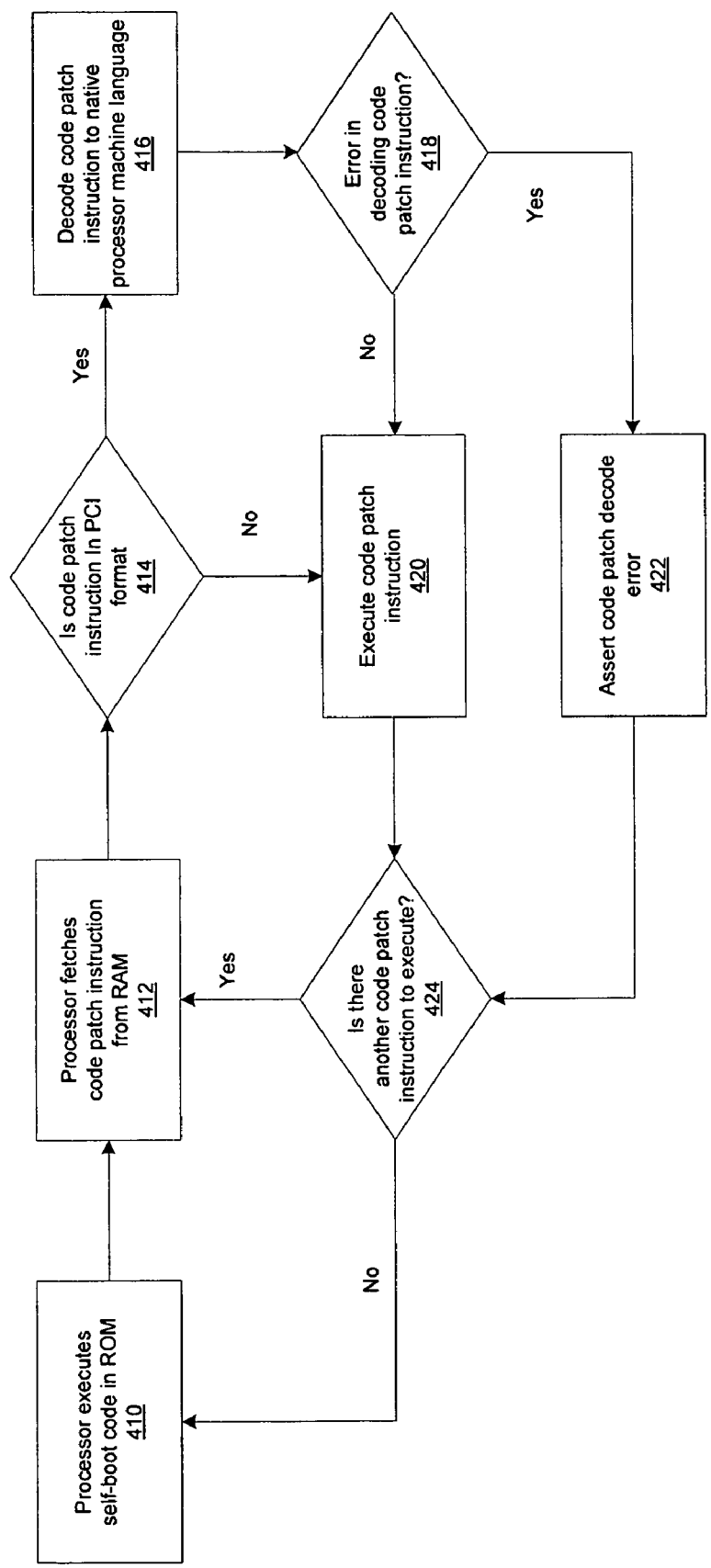
FIG. 4 is a flow chart illustrating exemplary steps for executing a code patch, in accordance with an embodiment of the invention.

FIG. 4 is a flow chart illustrating exemplary steps for executing a code patch, in accordance with an embodiment of the invention. Referring to FIG. 4, in step 410, the processor 210 may execute instructions of the self-boot code 219, for example. Execution of the self-boot code 219 may lead to execution of code patches stored in the RAM 212 if the code patches are present. The code patches may have been copied to the RAM 212 from the NVRAM 222 that may be external to the NAC 109.

In step 412, the processor 210 may fetch a code patch instruction from the RAM 212. In step 414, the processor 210 may determine whether the code patch instruction may be in PCI format. This may be done prior to fetching a first instruction for each code patch by determining whether a corresponding instruction type bit T may be set. If the corresponding type bit T is set, the code patch instruction may be in the native processor, for example, MIPS, machine language. Accordingly, the code patch instruction may not need to be decoded and the next step may be step 420. Otherwise, the code patch instruction may be in PCI format and may need to be decoded to the MIPS machine language in step 416 before being executed. The instruction in PCI format may require less memory space to store than the equivalent decoded MIPS machine language instruction.

In step 416, the processor 210 may use instructions in the self-boot code 219 to decode the code patch instruction. In step 418, the processor 210 may determine whether the code patch instruction can be decoded. If the code patch instruction is recognized as a valid PCI format instruction and may be decoded, the next step may be step 420. If the bit pattern in the code patch instruction is not recognized as a valid PCI format instruction, the processor 210 may assert a code patch decode error in step 422.

In step 420, the processor 210 may execute the code patch instruction. The instruction executed may be MIPS instruction read directly from the RAM 212 or at least one MIPS instruction that may be the result of decoding the PCI format code patch instruction. The next step may be step 424.

In step 422, if the processor 210 cannot decode the code patch instruction, the processor 210 may indicate a code patch execution error. The processor 210 may indicate the error, for example, by asserting bit 13 of the memory location 0xC10 in the RAM 212. The processor 210 may ignore the instruction that cannot be decoded without causing, for example, an interrupt, exception, error handling, or halting of the processor 210. Accordingly, the error may be indicated so that the processor 210 may, at a later time, read the memory location 0xC10. The processor 210 may store error related information that may be used for debugging. This information may be used to troubleshoot instructions in the code patch block 223 and/or decoding instructions in the self-boot code 219. Each code patch may be either an initialization code patch (ICP) or a service code patch (SCP).

In step 424, the processor 210 may determine whether there is another code patch instruction to fetch and execute. If there is, the next step may be step 412 where the processor 210 may fetch the next code patch instruction from the RAM 212. If there is no more instruction to fetch and execute for the code patch, the next step may be step 410 where the processor 210 may further execute instructions in the self-boot code 219.

Certain embodiments for reducing instruction storage space for a processor integrated in the NAC 109 may include the processor 210 within the NAC 109 that generates MIPS instructions from corresponding new instructions. The new instructions may be PCI format code patch instructions that may have been copied from the NVRAM 222, which may be external to the NAC 109, to the RAM 212, which may be within the NAC 109. The processor 210 may copy the code patch instructions from the NVRAM 222 during bootup of the NAC 109. The new instructions may comprise fewer bits than the generated MIPS instructions. The processor 210 may generate the MIPS instructions by interpreting the corresponding new instructions that may be in PCI format. The generation of the MIPS instructions may occur during bootup of the NAC 109. The processor 210 may execute the generated MIPS instructions.

The processor 210 may validate data stored in the NVRAM 222 and/or the RAM 212, which may comprise the code patches, by verifying that the signature in the signature field 250*a* is valid and/or by verifying that the checksum in the checksum field 250*g* is correct. The processor 210 may determine whether the data stored in the RAM 212, for example, the code patches, which may be copied from the NVRAM 222, may be in PCI format. The code patches may comprise the instruction code patch (ICP) and the service code patch (SCP).

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for reducing storage space for instructions, the method comprising:

storing new instructions in a nonvolatile random access memory;

generating, within a network adapter chip, native processor machine language instructions from corresponding new instructions stored in the nonvolatile random access memory that is external to the network adapter chip, the new instructions comprising fewer bits than said native processor machine language instructions, the native processor machine language instructions being configured in a native processor machine language instruction format, the new instructions being configured into a patch code instruction format in which the new instructions do not comprise a native processor machine language, the patch code instruction format comprising a memory map format for use with the nonvolatile random access memory, the memory map format comprising a signature field, a format field, a flag field and a data block, the flag field comprising a first flag, a second flag and other flags, the first flag indicating that a service code patch is present in the data block, the second flag indicating that an initialization code patch is present in the data block, one or more of the other flags relating to power supplied to the network adapter chip, the new instructions being configured into the patch code instruction format to save memory space in the nonvolatile random access memory and being configured to modify boot functionality of a self boot code, said network adapter chip comprising a physical layer, a media access controller layer, a processor, a random access memory and a read only memory, the physical layer being connected to a gigabit Ethernet and handling voice and data traffic, the native processor machine language instructions resulting from decoding of the new instructions by the processor, the new instructions that are not able to be decoded by the processor being ignored without causing an interrupt or an exception, the read only memory providing the self boot code that generates said native processor machine language instructions from the corresponding new instructions stored in the nonvolatile memory during a boot phase of the network adapter chip, the read only memory providing the self boot code that generates said native processor machine language instructions from the corresponding new instructions stored in the nonvolatile memory that execute in a loop after the boot phase of the network adapter chip; and executing said generated native processor machine language instructions within said network adapter chip.

2. The method according to claim 1, comprising interpreting within said network adapter chip, said corresponding new instructions.

3. The method according to claim 1, wherein said generation occurs during bootup of said network adapter chip.

4. The method according to claim 1, wherein said new instructions are stored in memory external to said network adapter chip.

5. The method according to claim 4, comprising during bootup of said network adapter chip, copying said new instructions from said memory external to said network adapter chip to on-chip memory within said network adapter chip.

6. The method according to claim 5, comprising validating data stored in at least a portion of said memory external to said network adapter chip.

7. The method according to claim 6, comprising determining a format of said data stored in said memory external to said network adapter chip.

8. The method according to claim 1, wherein execution of said generated native processor machine language instructions from said corresponding new instructions occurs during runtime.

9. The method according to claim 1, comprising executing within said network adapter chip, code patch comprising said generated native processor machine language instructions.

10. The method according to claim 9, wherein said code patch comprises instruction code patch and service code patch.

11. A machine-readable storage having stored thereon, a computer program having at least one code section for reducing storage space for instructions, the at least one code section being executable by a machine for causing the machine to perform steps comprising:

generating, within a network adapter chip, native processor machine language instructions from corresponding new instructions stored in a nonvolatile memory during a boot phase of the network adapter chip, the new instructions comprising fewer bits than said native processor machine language instructions, the native processor machine language instructions being configured in a native processor machine language instruction format, the new instructions being configured into a patch code instruction format in which the new instructions do not comprise a native processor machine language, the patch code instruction format comprising a memory map format for use with the nonvolatile random access memory, the memory map format comprising a signature field, a format field, a flag field and a data block, the flag field comprising a first flag, a second flag and other flags, the first flag indicating that a service code patch is present in the data block, the second flag indicating that an initialization code patch is present in the data block, one or more of the other flags relating to power supplied to the network adapter chip, the new instructions being configured into the patch code instruction format to save memory space in the nonvolatile memory and being configured to modify boot functionality of a self boot code, the native processor machine language instructions resulting from decoding of the new instructions by the processor, the new instructions that are not able to be decoded by the processor being ignored without causing an interrupt or an exception; and executing said generated native processor machine language instructions within said network adapter chip.

12. The machine-readable storage according to claim 11, comprising code for interpreting within said network adapter chip, said corresponding new instructions.

13. The machine-readable storage according to claim 11, wherein said generation occurs during bootup of said network adapter chip.

14. The machine-readable storage according to claim 11, wherein said new instructions are stored in memory external to said network adapter chip.

15. The machine-readable storage according to claim 14, comprising code for copying said new instructions from said memory external to said network adapter chip to on-chip memory within said network adapter chip during bootup of said network adapter chip.

16. The machine-readable storage according to claim 15, comprising code for validating data stored in at least a portion of said memory external to said network adapter chip.

17. The machine-readable storage according to claim 16, comprising code for determining a format of said data stored in said memory external to said network adapter chip.

18. The machine-readable storage according to claim 11, wherein execution of said generated native processor machine language instructions from said corresponding new instructions occurs during runtime.

19. The machine-readable storage according to claim 11, comprising code for executing within said network adapter chip, code patch comprising said generated native processor machine language instructions.

20. The machine-readable storage according to claim 19, wherein said code patch comprises instruction code patch and service code patch.

21. A system for reducing storage space for instructions, the system comprising:

a nonvolatile memory coupled to a processor of a network adapter chip, the nonvolatile memory being external to the network adapter chip;

the processor configured to generate, within the network adapter chip, native processor machine language instructions from corresponding new instructions in nonvolatile memory during a boot phase of the network adapter chip, the new instructions comprising fewer bits than said native processor machine language instructions, the native processor machine language instructions being configured in a native processor machine language instruction format, the new instructions being configured into a patch code instruction format in which the new instructions do not comprise a native processor machine language, the patch code instruction format comprising a memory map format for use with the nonvolatile random access memory, the memory map format comprising a signature field, a format field, a flag field and a data block, the flag field comprising a first flag, a second flag and other flags, the first flag indicating that a service code patch is present in the data block, the second flag indicating that an initialization code patch is present in the data block, one or more of the other flags relating to power supplied to the network adapter chip, the new instructions being configured into the patch code instruction format to save memory space in the nonvolatile memory and being configured to modify boot functionality of a self boot code, said network adapter chip comprising a physical layer, a media access controller layer, a processor, a random access memory and a read only memory, the physical layer being connected to a network and handling voice and data traffic, the native processor machine language instructions resulting from decoding of the new instructions by the processor, the new instructions that are not able to be decoded by the processor being ignored without causing an interrupt or an exception, the read only memory providing the self boot code that generates said native processor machine language instructions from the corresponding new instructions stored in the nonvolatile memory during a boot phase of the network adapter chip; and said processor executes said generated native processor machine language instructions within said network adapter chip.

22. The system according to claim 21, comprising said processor that interprets within said network adapter chip, said corresponding new instructions.

23. The system according to claim 21, wherein said generation occurs during bootup of said network adapter chip.

24. The system according to claim 21, wherein said new instructions are stored in memory external to said network adapter chip.

25. The system according to claim 24, comprising said processor that copies said new instructions from said memory external to said network adapter chip to on-chip memory within said network adapter chip during bootup of said network adapter chip.

26. The system according to claim 25, comprising said processor that validates data stored in at least a portion of said memory external to said network adapter chip.

27. The system according to claim 26, comprising said processor that determines a format of said data stored in said memory external to said network adapter chip.

28. The system according to claim 21, wherein execution of said generated native processor machine language instructions from said corresponding new instructions occurs during runtime.

29. The system according to claim 21, comprising said processor that executes within said network adapter chip, code patch comprising said generated native processor machine language instructions.

30. The system according to claim 29, wherein said code patch comprises instruction code patch and service code patch.

* * * * *